(12) United States Patent
Cooper et al.

(10) Patent No.: US 11,470,451 B2
(45) Date of Patent: Oct. 11, 2022

(54) SYSTEM AND METHOD FOR AUTOMATED DATA COLLECTION AND ANCHOR LOCATION EVALUATION

(71) Applicants: DENSO International America, Inc., Southfield, MI (US); DENSO CORPORATION, Kariya (JP)

(72) Inventors: Kyle Cooper, Plainwell, MI (US); Eric J. Smith, Holland, MI (US); Loren Vredevoogd, Holland, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 0 days.

(21) Appl. No.: 17/219,245

(22) Filed: Mar. 31, 2021

(65) Prior Publication Data

US 2021/0392461 A1 Dec. 16, 2021

Related U.S. Application Data

(60) Provisional application No. 63/039,759, filed on Jun. 16, 2020.

(51) Int. Cl.
| | |
|---|---|
| *H04W 4/029* | (2018.01) |
| *H04W 4/38* | (2018.01) |
| *H04W 24/10* | (2009.01) |
| *H04W 4/02* | (2018.01) |
| *H04W 64/00* | (2009.01) |
| *H04W 4/40* | (2018.01) |

(52) U.S. Cl.
CPC ............ *H04W 4/029* (2018.02); *H04W 4/023* (2013.01); *H04W 4/38* (2018.02); *H04W 4/40* (2018.02); *H04W 24/10* (2013.01); *H04W 64/00* (2013.01)

(58) Field of Classification Search
CPC ......... H04W 4/029; H04W 4/38; H04W 4/40; H04W 4/023; H04W 24/10; H04W 64/00
See application file for complete search history.

(56) References Cited

U.S. PATENT DOCUMENTS

| | | | |
|---|---|---|---|
| 9,964,468 B1 * | 5/2018 | Wu ......................... | G01M 5/00 |
| 2003/0090365 A1 * | 5/2003 | Bergerhoff ......... | G07C 9/00309 |
| | | | 340/5.61 |
| 2005/0130677 A1 | 6/2005 | Meunier et al. | |
| 2005/0192056 A1 | 9/2005 | Karaki | |
| 2005/0266855 A1 | 12/2005 | Zeng et al. | |

(Continued)

FOREIGN PATENT DOCUMENTS

| | | | |
|---|---|---|---|
| JP | 2008224445 A | * | 9/2008 |
| JP | 2008-281522 | | 11/2008 |

(Continued)

*Primary Examiner* — Dung Hong
(74) *Attorney, Agent, or Firm* — Warner Norcross + Judd LLP

(57) ABSTRACT

A system and method for obtaining location data for a portable device relative to an object. The system and method may include an object device disposed in a fixed position relative to the object, the object device having an antenna configured to communicate wirelessly via UWB with the portable device via a communication link. The system may include a control system, such as a robot and/or a remote controller, configured to obtain one or more samples pertaining to communications between the portable device and the object device.

11 Claims, 29 Drawing Sheets

(56) References Cited

U.S. PATENT DOCUMENTS

2016/0295435 A1* 10/2016 Baroudi ................. H04W 4/70
2017/0232974 A1*  8/2017 Nishida ............... G05D 1/0088
                                                       701/24
2018/0213355 A1*  7/2018 Smith .................. H01Q 1/3291

FOREIGN PATENT DOCUMENTS

JP         2009301546 A  * 12/2009  ........... G06F 16/951
JP         2013-031045      2/2013
WO    WO-2021075210 A1 *  4/2021

* cited by examiner

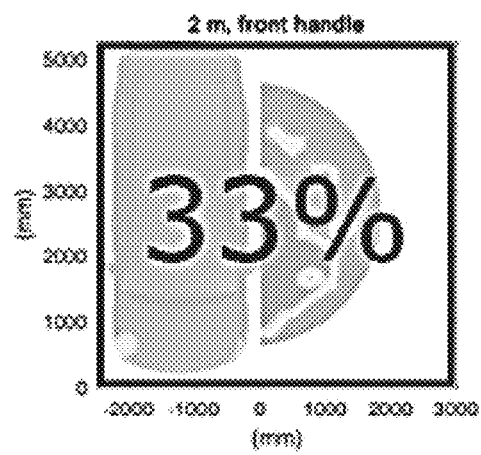
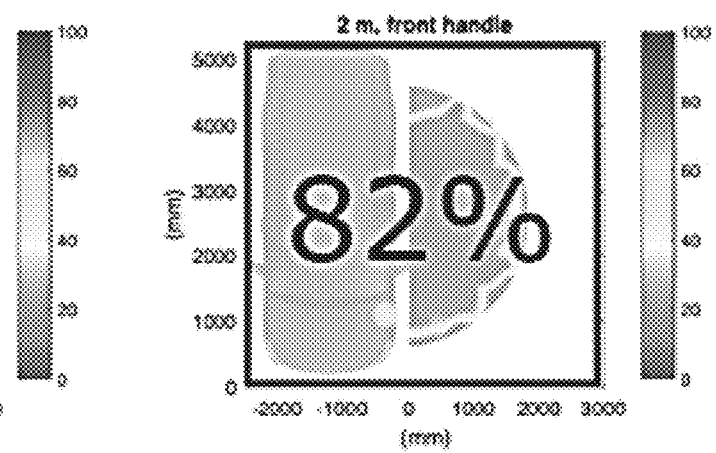
Fig. 19  Fig. 20
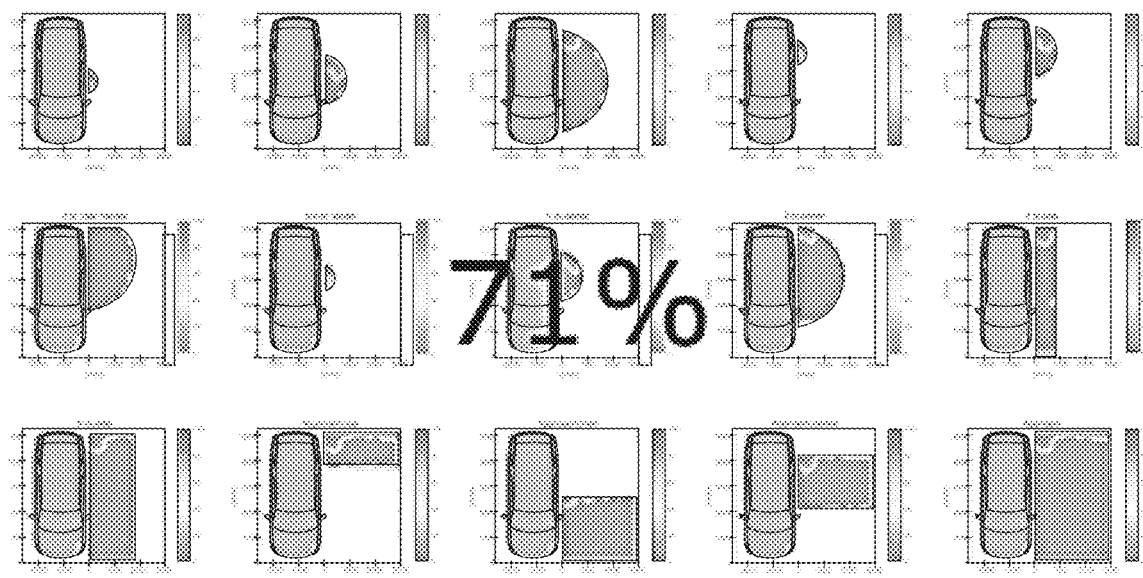
Fig. 21

| Detectability | | RMSE | | FWHM | | RMSE background | |
|---|---|---|---|---|---|---|---|
| Anchor | Value | Anchor | Value | Anchor | Value | Anchor | Value |
| 3 | 88 | 3 | 124 | 7 | 64 | 7 | 218 |
| 6 | 87 | 6 | 159 | 10 | 75 | 6 | 249 |
| 16 | 84 | 7 | 170 | 3 | 86 | 5 | 254 |
| 7 | 83 | 10 | 183 | 18 | 87 | 12 | 387 |
| 12 | 82 | 18 | 189 | 6 | 102 | 8 | 425 |
| 10 | 81 | 12 | 193 | 2 | 106 | 3 | 474 |
| 17 | 75 | 16 | 212 | 12 | 110 | 10 | 704 |
| 5 | 75 | 5 | 234 | 15 | 117 | 17 | 775 |
| 15 | 73 | 17 | 246 | 8 | 120 | 15 | 784 |
| 18 | 72 | 8 | 252 | 5 | 136 | 16 | 831 |
| 2 | 71 | 4 | 265 | 17 | 146 | 18 | 964 |
| 4 | 70 | 11 | 277 | 16 | 172 | | |
| 8 | 68 | 9 | 285 | 4 | 181 | | |
| 11 | 68 | 2 | 319 | 9 | 201 | | |
| 9 | 67 | 21 | 349 | 21 | 207 | | |
| 20 | 62 | 13 | 366 | 11 | 208 | | |
| 21 | 57 | 19 | 495 | 20 | 209 | | |
| 13 | 52 | 1 | 496 | 19 | 241 | | |
| 19 | 51 | 14 | 774 | 1 | 249 | | |
| 1 | 49 | 20 | 886 | 13 | 337 | | |
| 14 | 31 | 22 | 903 | 14 | 404 | | |
| 22 | 24 | 15 | 1137 | 22 | 409 | | |

SYSTEM AND METHOD FOR AUTOMATED DATA COLLECTION AND ANCHOR LOCATION EVALUATION

FIELD OF INVENTION

The present disclosure relates to a system and method for data collection with respect to a location system, and more particularly for a location system that determines location of a portable device with respect to an object, such as a vehicle.

BACKGROUND

Ultra wideband (UWB) technology for cooperative source localization has been actively researched over the last 15 years with predecessors dating back to the 1970s. Using UWB for remote keyless entry to vehicles (via a smartphone and an on-vehicle suite of anchors or devices) is much newer; with industry leaders still looking to develop and standardize such systems. For example, currently, only a single line of smartphones includes UWB capability. One of the many challenges for placing UWB anchors on a vehicle is understanding where they should be placed and what type of performance should be expected with respect to accurate ranging and subsequent localization of the initiator (smartphone).

SUMMARY

In one embodiment, a system for obtaining location data for a portable device relative to an object is provided. The system may include an object device disposed in a fixed position relative to the object, the object device having an antenna configured to communicate wirelessly via UWB with the portable device via a communication link. The system may include a control system, such as a robot and/or a remote controller, configured to obtain one or more samples pertaining to communications between the portable device and the object device.

The control system may be configured to obtain a first set of the one or more samples with respect to the portable device being at a first position, and to obtain a second set of the one or more samples with respect to the portable device being at a second position.

The system may include a movable body operably coupled to the portable device, where the movable body is configured to position the portable device in accordance with a position directive communicated from the control system.

The control system of the system may be configured to direct movement of the movable body to change a position of the portable device from the first position to the second position.

In one embodiment, the control system may be configured to calculate a set of metrics at each of the first and second positions. The control system may generate a composite score for each of the first and second positions respectively based on the set of metrics.

In one embodiment, the composite score is indicative of a performance of an anchor position for a UWB sensor on the object.

In one embodiment, the control system may be configured to generate one or more candidate anchor positions based on the composite scores generated with respect to the first and second positions.

In general, one innovative aspect of the subject matter described herein can be a system for obtaining location data for a portable device relative to an object. The system may include one or more of the following: an object device disposed in a fixed position relative to the object, the object device having an antenna configured to communicate wirelessly via UWB with the portable device via a communication link; a control system configured to obtain one or more samples pertaining to communications between the portable device and the object device, the control system configured to obtain a first set of the one or more samples with respect to the portable device being at a first position, the control system configured to obtain a second set of the one or more samples with respect to the portable device being at a second position; a movable body operably coupled to the portable device, the movable body being configured to position the portable device in accordance with a position directive communicated from the control system; and the control system configured to direct movement of the movable body to change a position of the portable device from the first position to the second position.

The foregoing and other embodiments can each optionally include one or more of the following features, alone or in combination. In particular, one embodiment includes all the following features in combination.

In some embodiments, the control system may be configured to obtain sensor characteristic data for the first and second positions, where the control system may be configured to generate a composite score for the object device based on the sensor characteristic data.

In some embodiments, the composite score may be indicative of a performance of a sensor position for a UWB sensor on the object.

In some embodiments, the system comprises first and second sensor devices disposed on the object at respective first and second candidate locations, where the first sensor device is the object device.

In some embodiments, the control system may be configured to calculate a first composite score for the first sensor and a second composite score for the second sensor.

In some embodiments, the control system may be configured to identify a relative ranking of the first and second candidate locations based on the first and second composite scores.

In some embodiments, the relative ranking is indicative of a position providing greater accuracy relative to another position in determining a location of the portable device relative to the object, where the location of the portable device may be determined based on communications with the portable device via UWB.

In some embodiments, the composite score is based on an RMSE metric and a FWHM metric of the RMSE metric, where the RMSE metric and the FWHM metric are based on range measurements, where the range measurements are determined with respect UWB communications with the portable device and based on sensor characteristic data obtained for each of the first and second sensors.

In some embodiments, the composite score is based on a detectability metric.

In general, one innovative aspect of the subject matter described herein can include a method of evaluating performance of a first and second sensors disposed on an object at respective first and second candidate location, the performance pertaining to effectiveness for determining a location of a portable device relative to the object. The method may include one or more of the following: communicating wirelessly between the portable device and the first sensor at a first position; obtaining at least one first range measurement with respect to communications between the portable device and the first sensor at the first position; communicating wirelessly between the portable device and the second sensor at the first position; obtaining at least one second range measurement with respect to communications between the portable device and the second sensor at the first position; communicating a directive to a movable body to move the portable device from the first position to a second position; communicating wirelessly between the portable device and the first sensor at the second position; obtaining at least one third range measurement with respect to communications between the portable device and the first sensor at the second position; communicating wirelessly between the portable device and the second sensor at the second position; obtaining at least one fourth range measurement with respect to communications between the portable device and the second sensor at the second position; ranking a performance of the first and second sensors at the respective first and second candidate locations.

The foregoing and other embodiments can each optionally include one or more of the following features, alone or in combination. In particular, one embodiment includes all the following features in combination.

In some embodiments, the method comprises determining a first metric for the first sensor based on the first and third range measurements; determining a second metric for the second sensor based on the second and fourth range measurements; and ranking the performance of the first and second sensors based on the first and second metrics.

In some embodiments, the method comprises determining a third metric for the first sensor based on the first and third range measurements; determining a fourth metric for the second sensor based on the second and fourth range measurements; generating a first composite score for the first sensor based on the first and third metrics; generating a second composite score for the second sensor based on the second and fourth metrics; ranking the performance of the first and second sensors based on the first and second composite scores.

In some embodiments, the method comprises determining a performance score for the first and second sensor with respect to first and second zones, and generating composite scores for the first and second sensors respectively based on the performance score for the first and second zones.

In some embodiments, the method comprises transmitting a position directive to the movable body to travel from the first position to the second position.

In some embodiments, the wireless communications may be UWB communications.

In general, one innovative aspect of the subject matter described herein can include a system for evaluating performance of first and second sensors disposed on an object at respective first and second candidate locations, the performance pertaining to effectiveness for determining a location of a portable device relative to the object. The system may include one or more of the following: a movable body operably coupled to the portable device, the movable body being configured to position the portable device in accordance with a position directive; and a control system configured to obtain first samples pertaining to communications between the portable device and the first sensor at a first position. The control system may be configured to obtain second samples pertaining to communications between the portable device and the second sensor at the first position, and to obtain third samples pertaining to communications between the portable device and the first sensor at a second position. The control system may be configured to obtain fourth samples pertaining to communications between the portable device and the second sensor at the second position, where the control system is configured to communicate the position directive to the movable body to change a position of the portable device from the first position to the second position. The control system may be configured to rank a performance of the first and second sensors at the respective first and second candidate locations.

The foregoing and other embodiments can each optionally include one or more of the following features, alone or in combination. In particular, one embodiment includes all the following features in combination.

In some embodiments, the control system is operable to determine a first metric for the first sensor based on the first and third samples and to determine a second metric for the second sensor based on the second and fourth samples, where the control system is operable to rank the performance of the first and second sensors based on the first and second metrics.

In some embodiments, the control system is operable to determine a performance score for the first and second sensors with respect to first and second zones, where the control system is configured to generate composite scores for the first and second sensors respectively based on the performance score for the first and second zones.

In some embodiments, the communications are UWB communications.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 19 shows the detectability metric determined with respect to a zone under test in accordance with one embodiment.

FIG. 20 shows the detectability metric determined with respect to a zone under test in accordance with one embodiment.

FIG. 21 shows a composite score for the detectability metric of multiple zones under test in accordance with one embodiment.

DETAILED DESCRIPTION

Figure 1:
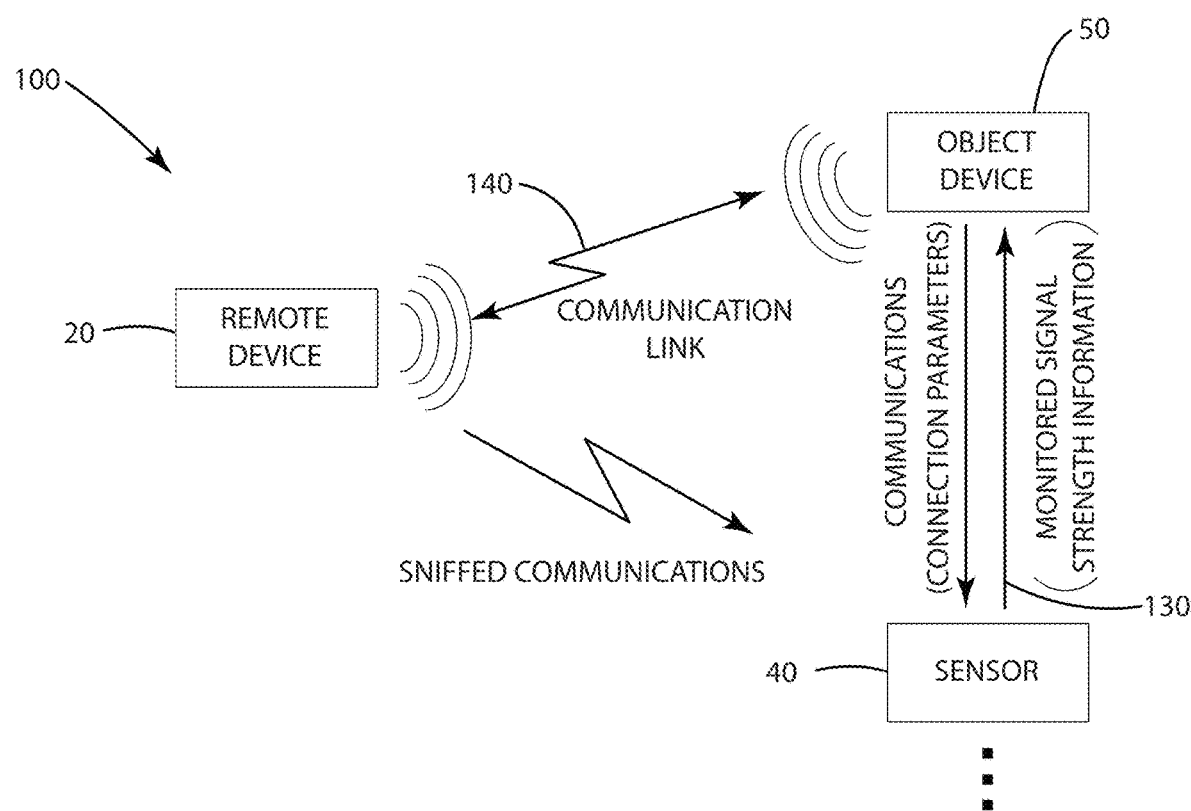
FIG. 1 shows a system in accordance with one embodiment of the present disclosure.

In one embodiment, a data collection system that includes automated data collection elements is provided. For example, a robot (or automated device) may be programmed to carry a UWB initiator along a predefined path (like a cornrow pattern), stopping for predefined intervals (e.g., 60 seconds) at predefined spacing (0.2 m). The initiator mounted to the robot may be wirelessly connected to a computer (or data collection device) via a Bluetooth gateway where ranging data is recorded at some sample rate (1 Hz or greater, 3.4 Hz or greater, 10 Hz or greater). Any sampling rate can be used including but not limited to 1 Hz, 3.4 Hz, and 10 Hz. In one instance, the sampling rate for a test system may be aligned or matched to a target sampling rate for a deployed or production system.

A set of anchors (e.g., 11 anchors or devices) may be placed in and around a vehicle, and configured to communicate with the initiator to measure range between each anchor and initiator.

Ranging may be achieved via a number of techniques. In one embodiment, a cooperative double sided, two-way ranging technique may be implemented. Because the robot is dwelling at a location for a set amount of time, the computer records an ensemble of range measurements between the initiator and each anchor. The robot dwells at each location in some predefined area and the system collects range data for each data point.

After the data is collected, post processing and analysis may be performed. The robot's position at each point with respect to the anchors may be determined and aligned with the collected range data. This can be done by using the logged, dead reckoning information from the robot along with time stamps in both the robot's logs and the UWB ranging data files to 1) align the robot in a coordinate system and 2) align the time the ranging data was collected to where the robot was located. In this way, ground truth may be established for the robot and, along with knowledge of where the anchors were placed, actual range from each anchor to each ground truth location.

Analysis in accordance with one embodiment may enable the system to determine anchor performance and to compare the performance to different anchor locations around the vehicle. A number of metrics may be employed to determine performance. As an example, the following four metrics may be utilized to evaluate performance: 1) root-mean-square error (RMSE); 2) full width half maximum (FWHM) of root-mean-square error; 3) a bespoke detectability metric; and 4) the change in RMSE when the initiator is in the clear (mounted on a PVC stand on the robot) as compared to when the initiator is placed in a human's back pocket. A composite score based on one or more metrics used to evaluate performance may be generated for each anchor location. As an example, the composite score may be determined by multiplying the metrics as follows: detectability*(1/RMSE)*(1/FWHM)*(1/change in RMSE with back pocket).

In one embodiment, in a remote keyless access system, some areas in relation to the vehicle are considered more significant than others. For example, the area near the driver's side door may be considered important because, in operational parameters for a real system, the door needs to unlock when the driver is proximate. Some areas are considered important for commercial reasons related to car insurance standards, which dictate performance standards for certain locations around a vehicle. Consequently, the metrics used to analyze anchor performance may be computed for different zones to better indicate performance of the anchor in a localization (or zone classification) system in that zone. Performance for the localization system in a zone or area considered to be of high value or significant may be evaluated based on performance for an anchor of that zone or area with respect to other zones.

While any number of zones may be used, in one embodiment, 15 zones around the driver's side zone of the vehicle may be identified and evaluated. Other zones including a mirror symmetrical set on the passenger side of the vehicle may be considered as well as different zones in front or back of the vehicle. By having overlap in the area of the 15 zones, the overall scoring can be weighted to areas considered significant or high value—e.g., areas that are in more than one zone.

It is noted that the detectability metric may vary from application to application, and may be evaluated in conjunction with multiple metrics. The detectability metric may indicate a likelihood of correctly classifying a zone based on the range measurements for an anchor at a given point in the zone. However, the present disclosure is not limited to the detectability metric. For instance, a different metric or multiple metrics may be used. As another example, the detectability metric may be provided as one input into a Bayesian zone classifier. That is, a generalized likelihood ratio test (GLRT) may be implemented that determines the likelihood that an initiator was in a zone based on the joint likelihood for each anchor's range measurements. The GLRT may calculate a probability of detection/probability of no detection for each anchor and the zone with the highest value may be determined to be the zone where the initiator is located.

In an alternative embodiment, a system of anchor evaluation may not apply to a vehicle access system. The system can be used to assess anchor or beacon locations for any type of distributed localization system. For example, to configure a set of anchors in a commercial space that localize smartphones distributed in that commercial space, knowledge of where to place the anchors or beacons will be valuable for the same reasons that it is useful for vehicle access systems; namely to mitigate locations that would result in blind spots or anchors that produce deleterious data that erodes localization performance.

In an alternative embodiment, to determine ground truth, a camera may be used along with computer vision (CV) software to determine where the initiator is at each frame of a video feed. The camera may be positioned with a view of the experimental collection field and calibrate pixels via in-scene fiducials. Then the CV software may track the initiator, transform the tracked camera coordinates (e.g., pixel location) to a world coordinate system (e.g., Cartesian coordinate with predefined origin).

In an alternative embodiment, the robot may be constrained with the initiator to an area with respect to the vehicle that matches each zone under test. In this way, the range data that is collected can be directly correlated to a zone under test with no knowledge of exact robot position. This approach may aid in determining zone-based metrics and may be used to gather data for a machine learning algorithm that matches range measurements to a zone. However, constraining the robot and associated data collection may be less impactful in conducting localization-centric analysis. In an alternative embodiment, a robot may be absent, and a human may carry the initiator and constrain the initiator to an area that aligns with a zone under test. As with the robot, the range data that is collected can be directly correlated to a zone under test with no knowledge of exact position of the human and the initiator.

In one embodiment, the system and methods described herein may facilitate anchor location performance evaluation with respect to a UWB-based remote access system. As described herein, the system and methods may be adapted for the realm of vehicles but the present disclosure is not so limited. The systems and methods may be adapted for other realms, such as non-vehicle based UWB localization system.

I. Location System Overview

A system in accordance with one embodiment is shown in the illustrated embodiment of FIG. 1 and generally designated 100. The system 100 may include one or more system components as outlined herein. A system component may be a user 60 or an electronic system component, which may be the remote device 20, a sensor 40, or an object device 50, or a component including one or more aspects of these devices. The underlying components of the object device 50, as discussed herein, may be configured to operate in conjunction with any one or more of these devices. In this sense, in one embodiment, there may be several aspects or features common among the remote device 20, the sensor 40, and the object device 50. The features described in connection with the object device 50 depicted in FIG. 3 may be incorporated into the remote device 20 or the sensor 40, or both. In one embodiment, the object device 50 may form an equipment component disposed on an object 10, such as a vehicle or a building. The object device 50 may be communicatively coupled to one or more systems of the object 10 to control operation of the object 10, to transmit information to the one or more systems of the object 10, or to receive information from the one or more systems of the object 10, or a combination thereof. For instance, the object 10 may include an object controller configured to control operation of the object 10. The object 10 may include one or more communication networks, wired or wireless, that facilitate communication between the object controller and the object device 50. The communication network for facilitating communications between the object device 50 and the object controller may be a CAN bus; however, it is to be understood that the communication network is not so limited. The communication network may be any type of network, including a wired or wireless network, or a combination of two or more types of networks.

The system 100 in the illustrated embodiment may be configured to determine location information in real-time with respect to the remote device 20. In the illustrated embodiment of FIG. 1, the user 60 may carry the remote device 20 (e.g., a smartphone). The system 100 may facilitate locating the remote device 20 with respect to the object 10 (e.g., a vehicle) in real-time with sufficient precision to determine whether the user 60 is located at a position at which access to the object 10 or permission for an object 10 command should be granted.

For instance, in an embodiment where the object 10 is a vehicle, the system 100 may facilitate determining whether the remote device 20 is outside the vehicle but in close proximity, such as within 5 feet, 3 feet, or 2 feet or less, to the driver-side door 15. This determination may form the basis for identifying whether the system 100 should unlock the vehicle. On the other hand, if the system 100 determines the remote device 20 is outside the vehicle and not in close proximity to the driver-side door (e.g., outside the range of 2 feet, 3 feet, or 5 feet), the system 100 may determine to lock the driver-side door. As another example, if the system 100 determines the remote device 20 is in close proximity to the driver-side seat but not in proximity to the passenger seat or the rear seat, the system 100 may determine to enable mobilization of the vehicle. Conversely, if the remote device 20 is determined to be outside close proximity to the driver-side seat, the system 100 may determine to immobilize or maintain immobilization of the vehicle.

The object 10 may include multiple object devices 50 or a variant thereof, such as an object device 50 including a sensor 40 coupled to an antenna array 30, in accordance with one or more embodiments described herein.

Micro-location of the remote device 20 may be determined in a variety of ways, such as using information obtained from a global positioning system, one or more signal characteristics of communications from the remote device 20, and one or more sensors (e.g., a proximity sensor, a limit switch, or a visual sensor), or a combination thereof. An example of microlocation techniques for which the system 100 can be configured are disclosed in U.S. Non-provisional patent application Ser. No. 15/488,136 to Raymond Michael Stitt et al., entitled SYSTEM AND METHOD FOR ESTABLISHING REAL-TIME LOCATION, filed Apr. 14, 2017—the disclosure of which is hereby incorporated by reference in its entirety.

Figure 2:
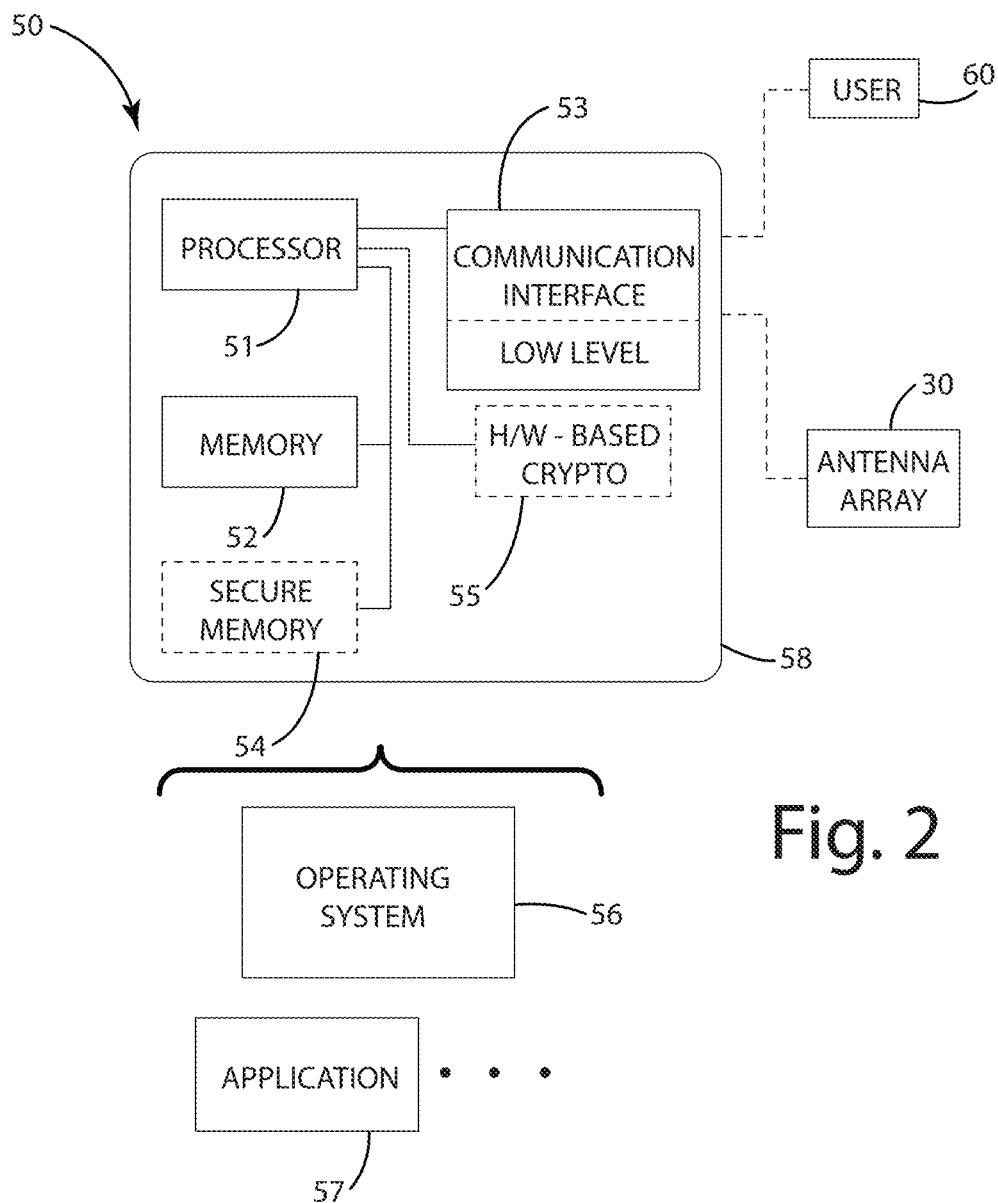
FIG. 2 shows a device in accordance with one embodiment.
Figure 3:
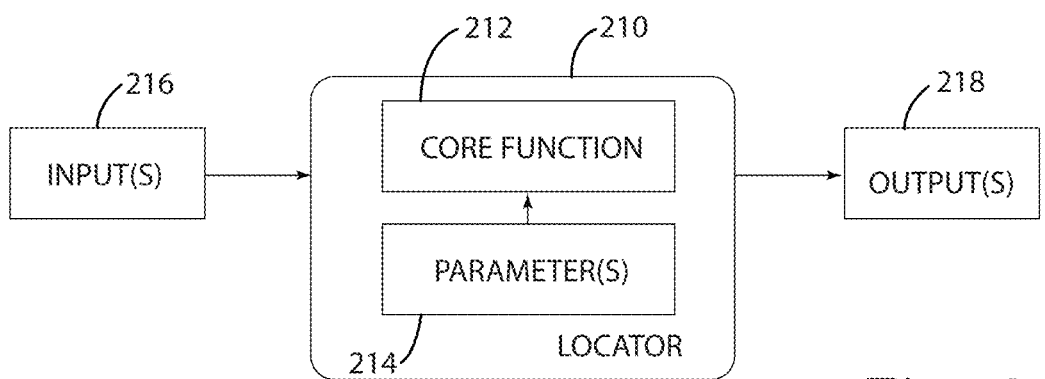
FIG. 3 shows a locator in accordance with one embodiment.

In one embodiment, in the illustrated embodiment of FIG. 1-3, the object device 50 (e.g., a system control module (SCM)) and a plurality of sensors 40 (coupled to an antenna array 30 shown in FIG. 3) may be disposed on or in a fixed position relative to the object 10. Example use cases of the object 10 include the vehicle identified in the previous example, or a building for which access is controlled by the object device 50.

The remote device 20 may communicate wirelessly with the object device 50 via a communication link 140, such as a BLE communication link or an Ultra Wideband (UWB) communication link. The plurality of sensors 40 may be configured to sniff the communications of the communication link 140 between the remote device 20 and the object device 50 to determine one or more signal characteristics of the communications, such as signal strength, time of arrival, time of flight, or angle of arrival, or a combination thereof. The determined signal characteristics may be communicated or analyzed and then communicated to the object device 50 via a communication link 130 separate from the communication link between the remote device 20 and the object device 50. Additionally, or alternatively, the remote device 20 may establish a direct communication link with one or more of the sensors 40, and the one or more signal characteristics may be determined based on this direct communication link.

Figure 4:
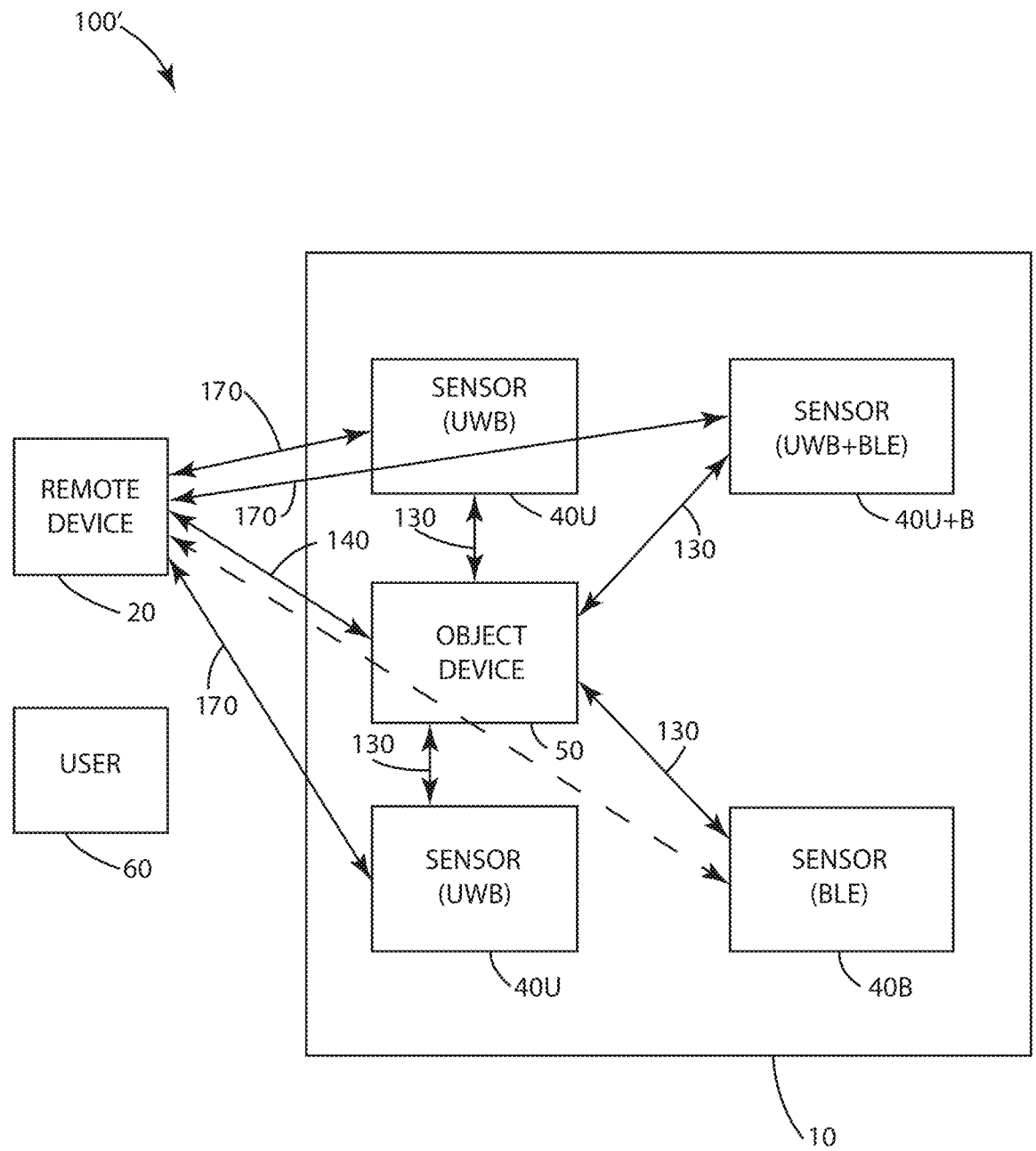
FIG. 4 shows a system in accordance with one embodiment.

For instance, an alternative configuration of the system is shown in the illustrated embodiment of FIG. 4, and generally designated 100'. The system 100' may include a remote device 20, a user 60, and an object 10, similar to the system 100 described in conjunction with FIG. 1. The object 10 in accordance with one embodiment may include an object device 50, an object control 12, and a plurality of sensors, which may be similar to the sensors 40 described herein.

In the illustrated embodiment, the remote device 20 may include both UWB and BTLE communication capabilities. For instance, the remote device 20 may be a portable device in the form of a smartphone with both UWB and BLE radios.

The system 100' in the illustrated embodiment of FIG. 4 may include one or more sensors 40 (which may also be described as anchors) that are disposed on the object 10. The one or more sensors 40 may be disposed in a variety of positions on the object 10, such as the positions described herein, including for instance, one or more sensors 40 in the door panel and one or more other sensors in the B pillar, as shown and described, for example, in connection with FIGS. 5 and 6.

One or more of the sensors 40 may be operable to communicate via at least one communication link according to a communication protocol. The communication link may be established via one or more channels. As described in connection with FIGS. 1-2, the sensor 40 may be operable to communicate by sniffing or receiving communications via at least one communication link 140 established between the object device 50 and the remote device 20, such that the sensor 40 does not transmit communications via the communication link 140. This type of communication for the sensor 40 is shown in phantom lines in FIG. 4.

One or more sensors 40 in the system 100' of FIG. 4 may be operable to communicate by transmitting and receiving communications via at least one communication link 170 established directly with the remote device 20. In this way, the sensor 40 may directly communicate with the remote device 20. The at least one communication link 170 may include communications according to more than one protocol (e.g., BTLE and UWB).

The one or more sensors 40 of the system 100' in the illustrated embodiment of FIG. 4 may be operable to a) sniff communications with respect to the communication link 140 between the remote device 20 and the object device 50, or b) directly communicate with the remote device 20 via the at least one communication link 170. The communication capabilities of the one or more sensors 40 in the illustrated embodiment is identified in the figure and by a letter designation U for UWB and B or BTLE. For example, the sensor 40U is an ultra-wideband anchor responsive to UWB signals; sensor 40U+B is responsive to both UWB and BTLE communications; and sensor 40B is a BTLE anchor.

It is to be understood that an object 10, such as a vehicle, may include more sensors 40 than shown in the illustrated embodiment of FIG. 4. Depending on the implementation, some number of sensors 40 may be integrated in a vehicle. For instance, 3 to 10 sensors 40 with both UWB and BTLE capabilities may be provided.

In one embodiment, UWB, similar to BTLE, is a standardized communication protocol (see IEEE 802.15.4a/z). One way in which UWB may differ from BTLE is with respect to ranging applications. UWB may involve transmitting short duration pulses that allow for time-of-flight functions to be used to determine the range from the remote device 20 to one or more sensors 40U, 40U+B (e.g., anchors). Then, in one embodiment, the object device 50 may implement a lateration function and/or a multilateration function to determine localization with respect to the remote device 20 (e.g., the location of the remote device 20 relative to the object 10). Lateration and/or multilateration may involve processing a set of ranges from the remote device 20 to each sensor 40 to output a position estimate of the remote device 20 relative to the object 10). The remote device 20 and the UWB-enabled sensors 40U, 40UB may transmit and receive packets of data back-and-forth, enabling a time-of-flight determination with respect to such communications.

The system 100 in the illustrated embodiment of FIG. 4 may include at least two different communication links for determining localization. For instance, the communication link 140 may utilize BTLE-based localization, and the communication link 170 may utilize UWB-based localization. In the illustrated embodiment, the communication link 170 is designated with respect to each of the sensors 40U, 40U+B; however, it is to be understood that each of these communication links 170 may not be the same. For instance, each of the communication links 170 may be separate (e.g., a separate channel or band).

Utilizing multiple communication links based on multiple types of communication methodologies for localization may provide a number of benefits.

For instance, in a configuration in which both BTLE and UWB information are obtained, this information can be combined to enhance and stabilize a localization estimate. The BTLE and UWB channels used in the localization may involve different frequencies, and the signal characteristics to be exploited for ranging are different (RSSI for BTLE and time-of-flight for UWB).

RSSI ranging calibration may be augmented or supplemented with time-of-flight from UWB communications. This augmentation or supplemental use of time-of-flight may be conducted in real-time by the system 100, 100', or conducted in a manner to adapt a model that uses sensed information not based on UWB communications (e.g., only sensed information with respect to BTLE communications).

For instance, one embodiment according to the present disclosure may be directed toward calibrating out variance of RSSI or range calculations. BTLE+UWB capable remote devices 20 may be tested to build up a map of BTLE communication characteristics, UWB communication characteristics, and ranging or localization data. A BTLE-only remote device 20 may be operable to process such maps but without UWB communications characteristics to refine RSSI-only range estimates. For instance, a locator 210, described in further detail herein, may be based on both BTLE+UWB communication characteristics; however, in practice, the locator 210 may generate location information based on BTLE communication characteristics without the UWB communication characteristics. Alternatively, the locator 210 may be based on BTLE communication characteristics, and may be operable in practice to generate location information based on both UWB and BTLE communication characteristics. It is to be understood that BTLE or UWB, or both, may be replaced with another type of communication protocol.

The remote device 20, in one embodiment, can establish a communication link 170 that may be direct with one or more of the sensors 40U, 40U+B, and the one or more signal characteristics (e.g., time-of-flight) may be determined based on this direct communication link 170.

As described herein, one or more signal characteristics, such as signal strength, time of arrival, time of flight, and angle of arrival, may be analyzed to determine location information about the remote device 20 relative to the object 10, an aspect of the object 10, or the object device 50, or a combination thereof. For instance, time difference of arrival or the angle of arrival, or both, among the sensors 40 and the object device 50 may be processed to determine a relative position of the remote device 20. The positions of the one or more antenna arrays 30 relative to the object device 50 may be known so that the relative position of the remote device 20 can be translated to an absolute position with respect to the antenna arrays 30 and the object device 50.

Additional or alternative types of signal characteristics may be obtained to facilitate determining position according to one or more algorithms, including a distance function, trilateration function, a triangulation function, a lateration function, a multilateration function, a fingerprinting function, a differential function, a time of flight function, a time of arrival function, a time difference of arrival function, an angle of departure function, a geometric function, or any combination thereof.

II. System Device Overview

In the illustrated embodiment of FIG. 2, the object device 50 may include a control system or controller 58 configured to control operation of the object device 50 in accordance with the one or more functions and algorithms discussed herein, or aspects thereof. The system components, such as the remote device 20 or the sensor 40, or both, may similarly include a controller 58.

The controller 58 may include electrical circuitry and components to carry out the functions and algorithms described herein. Generally speaking, the controller 58 may include one or more microcontrollers, microprocessors, and/or other programmable electronics that are programmed to carry out the functions described herein. The controller 58 may additionally or alternatively include other electronic components that are programmed to carry out the functions described herein, or that support the microcontrollers, microprocessors, and/or other electronics. The other electronic components include, but are not limited to, one or more field programmable gate arrays (FPGAs), systems on a chip, volatile or nonvolatile memory, discrete circuitry, integrated circuits, application specific integrated circuits (ASICs) and/or other hardware, software, or firmware. Such components can be physically configured in any suitable manner, such as by mounting them to one or more circuit boards, or arranging them in other manners, whether combined into a single unit or distributed across multiple units. Such components may be physically distributed in different positions in the object device 50, or they may reside in a common location within the object device 50. When physically distributed, the components may communicate using any suitable serial or parallel communication protocol, such as, but not limited to, CAN, LIN, Vehicle Area Network (VAN), FireWire, I2C, RS-232, RS-485, and Universal Serial Bus (USB).

As described herein, the terms locator, module, model, and generator designate parts of the controller 58. For instance, a model or locator in one embodiment is described as having one or more core functions and one or more parameters that affect output of the one or more core functions. Aspects of the model or locator may be stored in memory of the controller 58, and may also form part of the controller configuration such that the model is part of the controller 58 that is configured to operate to receive and translate one or more inputs and to output one or more outputs. Likewise, a module or a generator are parts of the controller 58 such that the controller 58 is configured to receive an input described in conjunction with a module or generator and provide an output corresponding to an algorithm associated with the module or generator.

The controller 58 of the object device 50 in the illustrated embodiment of FIG. 2 may include one or more processors 51 that execute one or more applications 57 (software and/or includes firmware), one or more memory units 52 (e.g., RAM and/or ROM), and one or more communication interfaces 53, amongst other electronic hardware. The object device 50 may or may not have an operating system 56 that controls access to lower-level devices/electronics via a communication interface 53. The object device 50 may or may not have hardware-based cryptography units 55—in their absence, cryptographic functions may be performed in software. The object device 50 may or may not have (or have access to) secure memory units 54 (e.g., a secure element or a hardware security module (HSM)). Optional components and communication paths are shown in phantom lines in the illustrated embodiment.

The controller 58 in the illustrated embodiment of FIG. 2 is not dependent upon the presence of a secure memory unit 54 in any component. In the optional absence of a secure memory unit 54, data that may otherwise be stored in the secure memory unit 54 (e.g., private and/or secret keys) may be encrypted at rest. Both software-based and hardware-based mitigations may be utilized to substantially prevent access to such data, as well as substantially prevent or detect, or both, overall system component compromise. Examples of such mitigation features include implementing physical obstructions or shields, disabling JTAG and other ports, hardening software interfaces to eliminate attack vectors, using trusted execution environments (e.g., hardware or software, or both), and detecting operating system root access or compromise.

For purposes of disclosure, being secure is generally considered being confidential (encrypted), authenticated, and integrity-verified. It should be understood, however, that the present disclosure is not so limited, and that the term "secure" may be a subset of these aspects or may include additional aspects related to data security.

The communication interface 53 may provide any type of communication link, including any of the types of communication links described herein, including wired or wireless. The communication interface 53 may facilitate external or internal, or both, communications. For instance, the communication interface 53 may be coupled to or incorporate the antenna array 30. The antenna array 30 may include one or more antennas configured to facilitate wireless communications, including BTLE communications and UWB communications.

As another example, the communication interface 53 may provide a wireless communication link with another system component in the form of the remote device 20, such as wireless communications according to the WiFi standard, BLTE, or UWB, or any combination thereof. In another example, the communication interface 53 may be configured to communicate with another device disposed on a vehicle (e.g., an object controller of the vehicle) via a wired link such as a CAN-based wired network that facilitates communication between a plurality of devices. The communication interface 53 in one embodiment may include a display and/or input interface for communicating information to and/or receiving information from the user 60.

In one embodiment, the object device 50 may be configured to communicate with one or more auxiliary devices of a type different from the remote device 20 or the sensor 40. In other words, the auxiliary device may be configured differently from the object device 50—e.g., the auxiliary device may not include a processor 51, and instead, may include at least one direct connection and/or a communication interface for transmission or receipt, or both, of information with the object device 50. For instance, the auxiliary device may be a solenoid that accepts an input from the object device 50, or the auxiliary device may be a sensor (e.g., a proximity sensor) that provides analog and/or digital feedback to the object device 50.

III. System for Determining Sensor Location

As described herein, the system 100 may include one or more sensors 40 disposed on an object 10, such as a vehicle. The location of the one or more sensors 40 on the object 10 may vary from application to application, depending on a variety of factors such as location availability and effectiveness. The effectiveness (also described herein as performance) of a sensor 40 can be considered a qualitative aspect of the sensed information obtained by the sensor 40 in facilitating an accurate location determination. For instance, if the sensor 40 is disposed at a location that is heavily shielded from wireless communications, the effectiveness of the sensor 40 is likely to be low—that is, any sensed information obtained by the sensor 40 is unlikely to be significantly indicative of a remote device 20 being at different locations relative to the object 10. On the other hand, a sensor 40 disposed at a location that is substantially unshielded and provides line of sight to a remote device 20 is more likely to be effective, with sensed information obtained by the sensor 40 being more indicative of the remote device 20 being at different positions relative to the object 10.

There are many factors that affect the effectiveness of a sensor 40 at a particular location on the object 10, some of which are inherent and unchangeable relative to the construction of the object 10 and others of which vary over time. As a result, the location choice for the one or more sensors 40 is often constrained at least by the construction of the object 10. One embodiment of the present disclosure may facilitate determining, during a configuration stage, a location for a sensor 40 that is considered effective for purposes of determining location of a remote device 20 relative to the vehicle. The metric for considering the location to be effective may be relative to several candidate locations, with the candidate location or locations that provide greater effectiveness being selected for one or more locations of the one or more sensors 40 in practice after the configuration stage.

Additional factors that affect the effectiveness of a sensor 40 at a particular location can include external factors, such as the manner in which a user 60 is carrying the remote device 20 and reflectivity of the surrounding environment (which can change as the object 50 moves from one environment to another).

Figure 5:
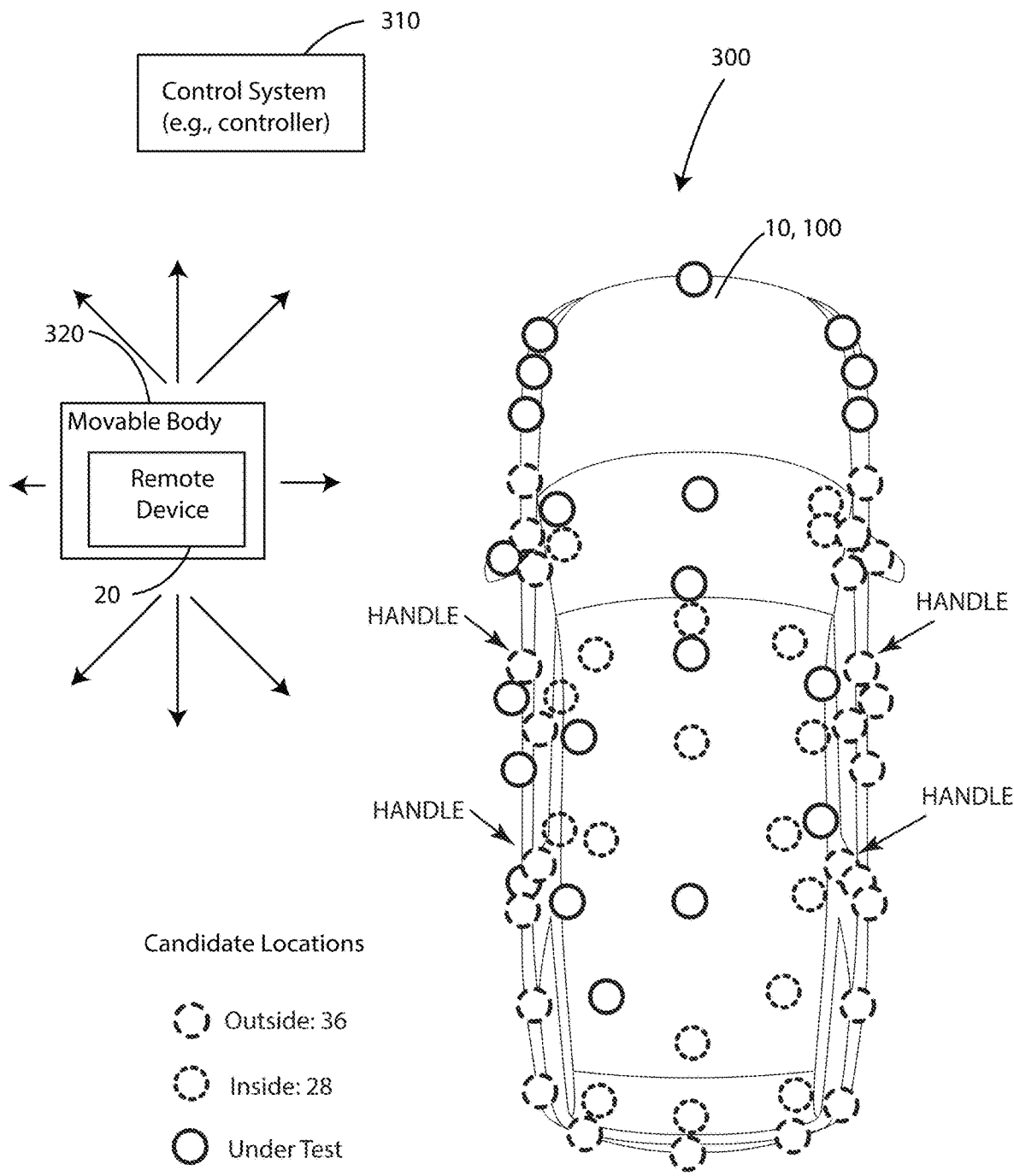
FIG. 5 shows a performance evaluation system in accordance with one embodiment of the present disclosure.
Figure 6:
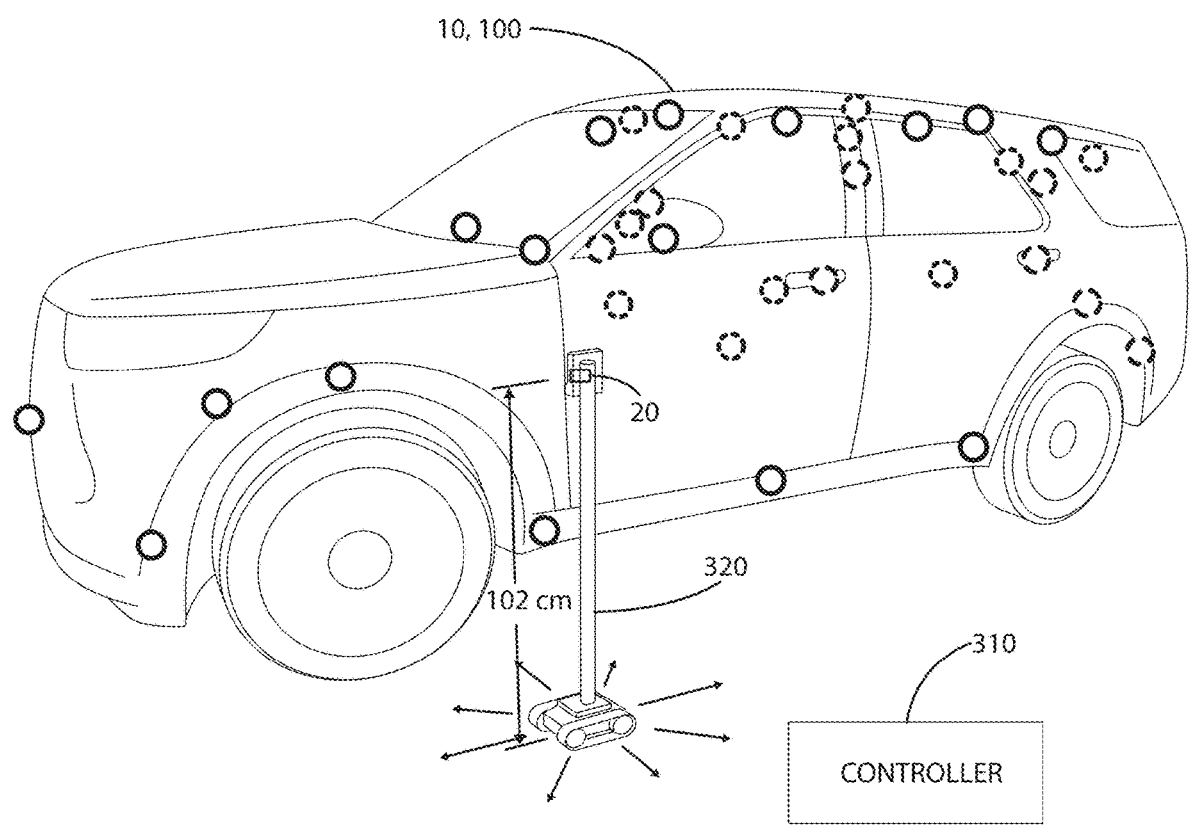
FIG. 6 shows the performance evaluation system of FIG. 5 in perspective.

A system for determining performance indicia or effectiveness for a plurality of candidate locations for sensors 40 is shown in the illustrated embodiment of FIGS. 5-6 and generally designated 300. For purposes of disclosure, the sensors 40 in FIGS. 5-6 are identifiable as circles with line types indicative of a location of a respective sensor being outside or inside, and under test. The system 300 includes one or more aspects of the system 100, 100', including a sensor 40, an object device 50, and a remote device 20. The system 300 may include a control system 310 in communication with one more aspects of the system 100 to collect sensor information obtained by one or more sensors 40 disposed on the object 10. The system 300 may include a movable body 320 coupled to the remote device 20 and controllable by the control system 310 to move the remote device 20 to a variety of positions relative to the object 10.

The system 300 in the illustrated embodiment of FIGS. 5-6 includes a movable body 320 in the form of a terrestrial robot capable of receiving commands to move the remote device 20 to particular locations relative to the object 10 (e.g., a vehicle). The movable body 320 may be capable of moving the remote device 20 to a position in three-dimensional space and optionally at one or more angular orientations. In an alternative embodiment, the movable body 320 may be configured without a terrestrial system, such as the movable body described in U.S. Nonprovisional patent application Ser. No. 16/713,363 to Eric J. Smith et al., entitled SYSTEM AND METHOD OF CALIBRATION FOR ESTABLISHING REAL-TIME LOCATION, filed Dec. 13, 2019—the disclosure of which is hereby incorporated by reference in its entirety.

The control system 310 may be configured to automatically direct a path of the remote device 20 in accordance with a predefined path. The predefined path may correspond to a plurality of points in three-dimensional space that are spaced apart. The points may be spaced apart equally. Alternatively, the points may be spaced as a function of proximity to the object 10 (e.g., the closer to the object 10, the more closely spaced the points.) This way, truth information (e.g., a position and sensor information with respect to communications from the remote device 20) may be obtained in a consistent manner for different types of objects 10 and different types of remote devices 20. An example test path is a raster path that covers the area surrounding the object 10 to a distance of 20 m.

At each test location of the test path, information from the system 100 may be collected as truth data. Additionally, a state of the system 100 or the object 10, or both, may be varied at the test location. For instance, a configuration of the object 10, such as whether a door of the object 10 is open or closed. The state information may form part of the truth data that facilitates testing of the system 100 and determining performance data for candidate locations of one or more sensors 40. The test path may also be conducted in different environments for the object 10 (e.g., in an open area outdoors, within a two-stall garage with the door open, within a two-stall garage with the door closed).

The data for the test location and the truth data may be correlated in a number of ways, such as by time or by actual knowledge of the test parameters at the time the true data is obtained.

In one embodiment, the test path of the remote device 20 may be dynamic, based on feedback from a training algorithm. For instance, if the training algorithm determines that a particular location or area is more indicative of performance for a sensor 40, the control system 310 of the system 300 may position the remote device 20 at a plurality of more closely spaced positions near this location or within the area of interest in an effort to enhance performance data for this region with a greater number of associated samples of truth data.

Additionally, the control system 310 may be configured to direct the system 300 to change or set an angular orientation of the remote device 20. The system 300, for instance, may include a plurality of motors (e.g., stepper motors) disposed proximal (or remote) to the remote device 20 and operable to change an angular orientation of the remote device 20. The angular orientation may be defined in accordance with Euler angles for roll ($\varphi$), pitch ($\theta$), and yaw ($\psi$). Alternatively, the angular orientation may be defined according to a normalized quaternion. The Euler angles or the quaternion may be determined relative to a reference coordinate frame (e.g., North, East, Down (NED) convention). By changing the angular orientation of the remote device 20 at a position, multiple samples of truth information may be obtained at that position. This way, performance data for a candidate location of a sensor 40 can be obtained for a variety of circumstances that may occur in use, such as various types of orientations that the user 60 carries the remote device 20, thereby enhancing the degree of confidence for the performance data.

In one embodiment, as described herein, the movable body 320 may be configured to carry a test object in addition to the remote device 20. The test object may be configured to affect communication between the remote device 20 and the system 100 in a manner similar to circumstances likely to be encountered in use. For instance, the test object may be a bag of liquid (e.g., water) that imitates to a large extent the effect of a user's body on communications with the remote device 20. The bag of liquid may have an effect on communications that is similar to the user placing the remote device 20 in their back pocket, with their body being disposed between the object 10 and the remote device 20.

The control system 310 of the system 300 may be configured similar to a system component described herein, including, for instance, one or more processors 51, one or more memory units 52, and one or more communication interfaces 53. The control system 310 may include a communication interface 53 configured to communicate with the movable body 320, and optionally the remote device 20. Communication between the control system 310 and the remote device 20 may be optional primarily because, in one embodiment of obtaining truth data, the remote device 20 may be left to operate independent of the control system 310, similar to how the remote device 20 would operate in use in one embodiment without being aware of a user's intent to move the remote device 20 from one area to another.

In the illustrated embodiment, an object interface of the control system 310 may be configured to communicate with an object device 50 of the object 10 to obtain information pertaining to one or more sensed characteristics of communication received from one or more sensors 40 and the remote device 20. For instance, the object device 50 may be configurable in a test mode in which the object device 50 communicates raw sensor information obtained with respect to communications transmitted from the remote device 20, such as raw sensor information conveyed to the object device 50 by a sensor 40 disposed at a candidate location.

For instance, as discussed herein, the object device 50 may be disposed on the object 10 and communicatively coupled to one or more sensors 40. The object device 50 and the one or more sensors 40 may be operable to sense or measure one or more signal characteristics of the communications transmitted from the remote device 20. The one or more sensors 40 may be provided connection parameters to enable the one or more sensors 40 to sniff communications transmitted from the remote device 20 to the object device 50. This way, the one or more sensors 40 may measure one or more signal characteristics of the communications transmitted from the remote device 20 and correlate these one or more measured signal characteristics with a time of measurement. The object device 50 may also measure one or more signal characteristics of communications transmitted from the remote device 20.

To provide an example, the object device 50 and the one or more sensors 40 may measure a signal strength of communications transmitted from the remote device 20. Because the object device 50 and the one or more sensors 40 may be disposed at different candidate locations on the object 10, these signal strength measurements may differ as a function of the different candidate locations. The object device 50 may transmit the measurements along with a timestamp for the measurements to the control system 310 for generation of truth data used to facilitate generating performance data for each candidate location of a sensor 40. The truth data in one embodiment may be based on a signal characteristic, such as time of flight, obtained with respect to UWB communications. Time of flight may be indicative of distance of the remote device 20 relative to one or more of the sensors 40. The UWB communications, and associated time of flight characteristic, may be established directly with one or more of the sensors 40 or the object device 50, or any combination thereof. In one embodiment, a signal characteristic obtained with respect to UWB communications may form part of the truth data that is processed along with a true location or true position of the remote device 20 relative to the object device 50, or the UWB-based signal characteristic may be provided as an indicator of an actual position of the remote device 20 relative to the object 10 for comparison against other sensed characteristics in generating performance data for a candidate location.

The control system 310 in the illustrated embodiment may include a position controller capable of transmitting a command to the movable body 320 to travel to a spatial coordinate in X, Y, Z Cartesian notation relative to an origin of the test area.

With information pertaining to one or more sensed characteristics of communication for each test position and each candidate location of a sensor 40, the control system 310 may develop a set of truth data of the candidate locations in connection with the object 10. This truth data may be stored in memory associated with the control system 310 and utilized to generate a performance metric for each candidate location.

A method in accordance with one embodiment of the present disclosure involves obtaining test samples and truth information with respect to a remote device 20 and a plurality of candidate locations for sensors 40 of the system 100. Each of the sensors 40 may measure one or more signal characteristics of communications between the object device 50 and the remote device 20 to form a plurality of test samples. Additionally, the method may involve obtaining truth information for each test sample. The truth information may include an actual location of the remote device 20 relative to the object 10 or other information, or a combination thereof. The actual location of the remote device 20 may be known by the control system 310, and changed by the control system 310 in accordance with a test path.

The determination of one or more specific values (i.e., RSSI offsets, variability indicators, etc.) or samples for the remote device 20 may be conducted in a repeatable, controlled manner via the system 300. This may facilitate obtaining performance data for each candidate location of the sensors 40.

The method may vary from application to application (e.g., for objects being vehicles vs. a building)—however, the method involves obtaining samples of the one or more signal characteristics under a variety of conditions, including, for example, different positions and orientations with respect to the object 10 or various placements of the remote device 20. In one embodiment, coverage of possible conditions may be determined based on use scenarios and whether a use scenario affects the one or more signal characteristics in a meaningful way different from other use scenarios that are tested. As an example, a use scenario in which the remote device 20 is placed in a first type of handbag may be substantially the same as the use scenario in which the remote device 20 is placed in a second type of handbag, which is provided for testing in the method. As a result, the use scenario with the first type of handbag may not be tested.

In one embodiment, the method may be adapted to test all or substantially all use scenarios identified as being of interest. It should be understood that the present disclosure is not limited to testing all or substantially all use scenarios—a subset of use scenarios may be tested for generating performance data for candidate locations of the sensors 40. In the case where the object 10 is a vehicle, the test procedure may be provided to cover a reasonable number of positions in all or substantially all zones, with the remote device 20 in all orientations and placements (hand, front pocket, back pocket, backpack, purse, etc.).

At each test location, and under each condition, the remote device 20 may be held in place for a period of time such as 10 to 30 seconds. During this time, the system 100 may be configured to obtain a plurality of samples with respect to the one or more signal characteristics described herein. For instance, the object device 50 or the sensor 40, or both, may sense one or more characteristics of communications with the remote device 20 under each condition. Example characteristics include signal strength (RSSI), time of flight, and angle of arrival.

It should be noted that the test environment or the conditions set may vary depending on the application. A test procedure that captures substantially all of the conditions identified above may be considered comprehensive for a particular type of object 10 and remote device 20. It should be noted that one or more of the identified conditions may be dropped from the conditions set or performed in alternate test procedures or alternative embodiments. The conditions identified for the method or the test procedure may be selected to capture the performance of the system in a reasonable number of use cases or conditions. Additionally, a method may be used to collect data (as described herein). The collected data may or may not be combined or stored in aggregate, although doing so may facilitate correlation of the collected data among the plurality of test conditions for the remote device 20 and the object 10. The collected data may be provided to a training module of the control system 310 in accordance with one embodiment.

The example conditions outlined above are generally static conditions where the remote device 20 is positioned and held still for a period of time. It should be noted that the present disclosure is not so limited. Additionally, or alternatively, the conditions used in the method may be functional tests in which circumstances may be dynamic. Examples of such functional tests include approaches, departures, and zone transitions, or combinations thereof.

In the illustrated embodiment of FIGS. 5-6, the system 300 may be configured to enable evaluation of candidate locations for one or more sensors 40 in conjunction with a remote device 20. The system 300 may enable capture of location performance for a sensor 40 that is operable for facilitating determining location via UWB communications. The system 300 may facilitate comparison of performance characterizations of candidate locations in a variety of locations relative to the object 10 (e.g., a vehicle), such as in a front driver side wheel well or a variety of positions as outlined in the illustrated embodiment of FIGS. 5-6. The system 300 may provide reproducible performance evaluations in conjunction with candidate locations for the one or more sensors 40 and the remote device 20. As described herein, the remote device 20 may vary from application to application, including from user to user (e.g., one user may have a remote device 20 in the form of an iPhone whereas another user may have a remote device 20 in the form of a Samsung Galaxy). The system 300 may facilitate obtaining repeatable results in evaluation for candidate locations for a variety of remote devices 20.

As described herein in conjunction with the system 300, candidate locations for one or more sensors 40 may be provided in a variety of locations relative to the object 10. In the illustrated embodiment, 22 candidate locations are provided and scored based on analysis of data obtained from sensors 40 disposed at each of the candidate locations and determined with respect to multiple zones in a target area relative to the object 10 (e.g., for 15 zones in a driver-side area of a vehicle). The analysis may include a score for each candidate location or a group of candidate locations. The score may vary depending on data and performance metrics obtained with respect to data from the plurality of sensors 40 in one embodiment, the score for a group of candidate locations may be based on a combined 1) range error, and 2) variability in range error and likelihood that range errors would contribute to misclassifying a zone in which the remote device 20 is located.

Data obtained in one embodiment is indicative of the following candidate locations as having high-performing scores: 1) high-end front center of wheel well (#3), 2) low and back of driver side doors (#6, #7), 3) front headliners (#10, #18), and 4) middle and front center of wheel well (#12). In this arrangement, a remote device 20 having a UWB communication interface (e.g., a UWB initiator capable of transmitting communications) is mounted to the movable body 320 at a height of 1 m. The movable body 320 may be moved within a target area of 3×5 m of the object 10 (e.g., a 3×5 m area proximal to a driver-side of a vehicle). The movable body 320 may traverse the target area in a grid-like manner, moving in steps of approximately 0.25 m with a dwell time at each location of approximately 60 seconds. The target area may be traverse in a variety of ways and is not limited to a grid-like traversal. For instance, the movable body 320 may move to multiple positions within the target area in a radial manner that fans out from a reference point of the object 10 (e.g., a driver-side door handle), with the movable body 320 having a dwell time at each location of approximately 60 seconds. Because the target area in this example relates to a reference point of the object, or a reference region thereof, the data collected with respect to movement of the movable body 320 in the remote device 20 may facilitate generation of performance data for top-performing or high-performing candidate locations of the one or more sensors 40 proximal to the reference point or region of the object 10.

Data can be obtained with respect to UWB communications with the remote device 20 and may be conducted for each sensor 40 at each candidate location, and this data may be analyzed in accordance with one or more embodiments described herein to yield a score for one or more sensors 40, or a group of sensors 40, or a combination thereof. It is to be understood that the type of communication between the remote device 20 in each sensor may vary from application, and is not limited to UWB communications. For instance, data analysis may be conducted based on BTLE communications with the remote device 20. It is further to be understood that the analysis and scoring described herein may be based on communications of more than one type, such as both UWB and BTLE communications.

In one embodiment, the position of the remote device 20 may be varied in the target area as described herein. Additionally, or alternatively, the environment or state, or both, of the remote device 20 may be varied at position. Variance in the environment or state of the remote device 20 may be conducted at each position of the remote device 20 in the target area. Alternatively, variance may be achieved by obtaining data with respect to each position of the remote device in the target area under one set of conditions, and at a later stage, obtaining data with respect to each position of the remote device in the target area under another set of conditions.

To provide an example, data may be collected with respect to the remote device 20 and one or more sensors 40 via movement of the movable body 320 within a target area. The remote device 20 in this example may be carried by the movable body 320 at a predetermined height and moved about the object 10. In a first data collection path, the movable body 320 may move the remote device 20 to a plurality of positions within the target area, with the path between the remote device 20 and the object being substantially free of obstructions. After traversing the target area in a manner described herein, an obstruction may be disposed between the object 10 in the remote device 20, and data may then be collected with respect a second data collection path that is similar to the first data collection path. The obstruction may be carried by the movable body 320 such that the obstruction is substantially present at all test locations along the data collection path. The first and second data collection paths in this example may be a radial, fanning out arrangement of test positions—however, it is to be understood that the first and second data collection path may be different depending on the application.

Data collected with respect to different sets of conditions (e.g., an obstruction and an obstruction-free data set) may be scored to determine performance for each of the candidate locations, or a group of candidate locations, of the plurality of sensors 40. By determining performance data under multiple sets of conditions, robustness of the performance data for the candidate locations can be enhanced. In one embodiment, a range error between two sets of conditions may be determined to capture both increase delay and increase variability in range measurements for candidate locations. As described herein, in obtaining test data for one embodiment of the present disclosure under multiple conditions, high-performing sensor locations for a vehicle include a lower driver-side door (#6, #7, #5), middle and front center of the wheel well (#12), and high-end front center of wheel well (#3).

A. Candidate Locations

The candidate locations for a plurality of sensors 40 may vary depending on the configuration of the object 10. For instance, candidate locations may be selected based on the construction of the object 10 and available mounting locations for the sensor 40. There may be conditions on placement of a sensor 40 that affect selection of a candidate location, such as a condition that the sensor 40 be substantially inconspicuous or hidden from view. A full set of candidate locations for an object 10 in the form of a vehicle is depicted in the illustrated by FIGS. 5 and 6. As can be seen, candidate locations may be disposed within aspects of the vehicle such as a vehicle cabin, a wheel well, or a door. A sensor 40 may be disposed at each of the candidate locations in conjunction with obtaining data for evaluating performance of each candidate location, as described herein.

Figure 7:
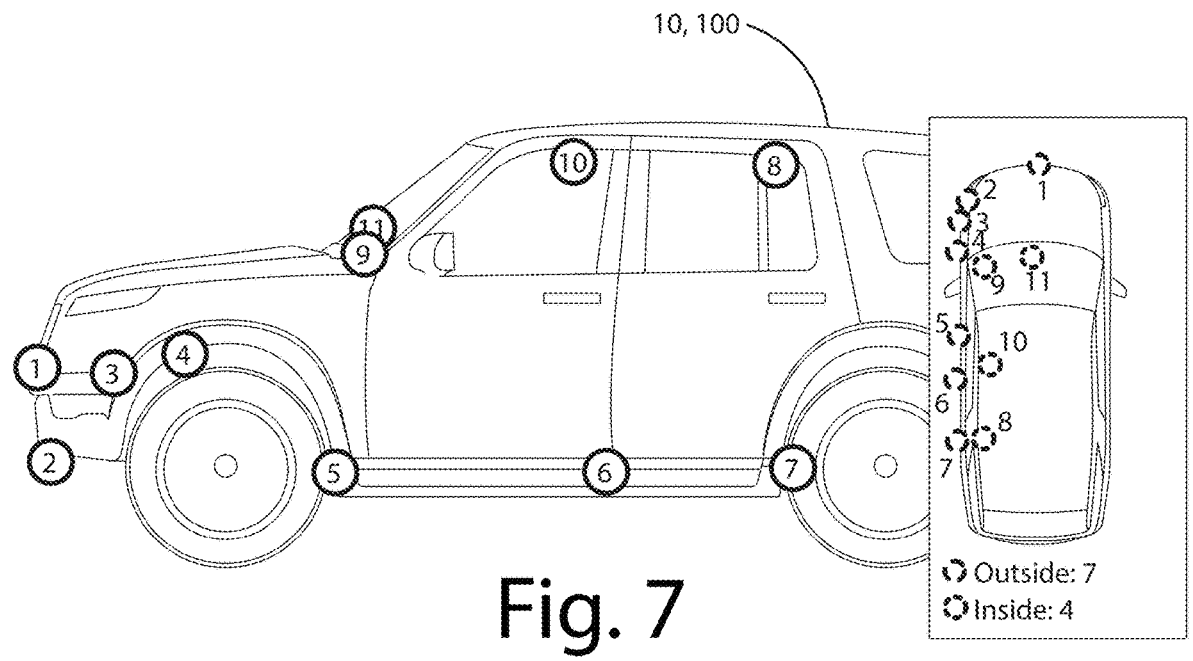
FIGS. 7 and 8 show a side view of the performance evaluation system with candidate locations.
Figure 8:
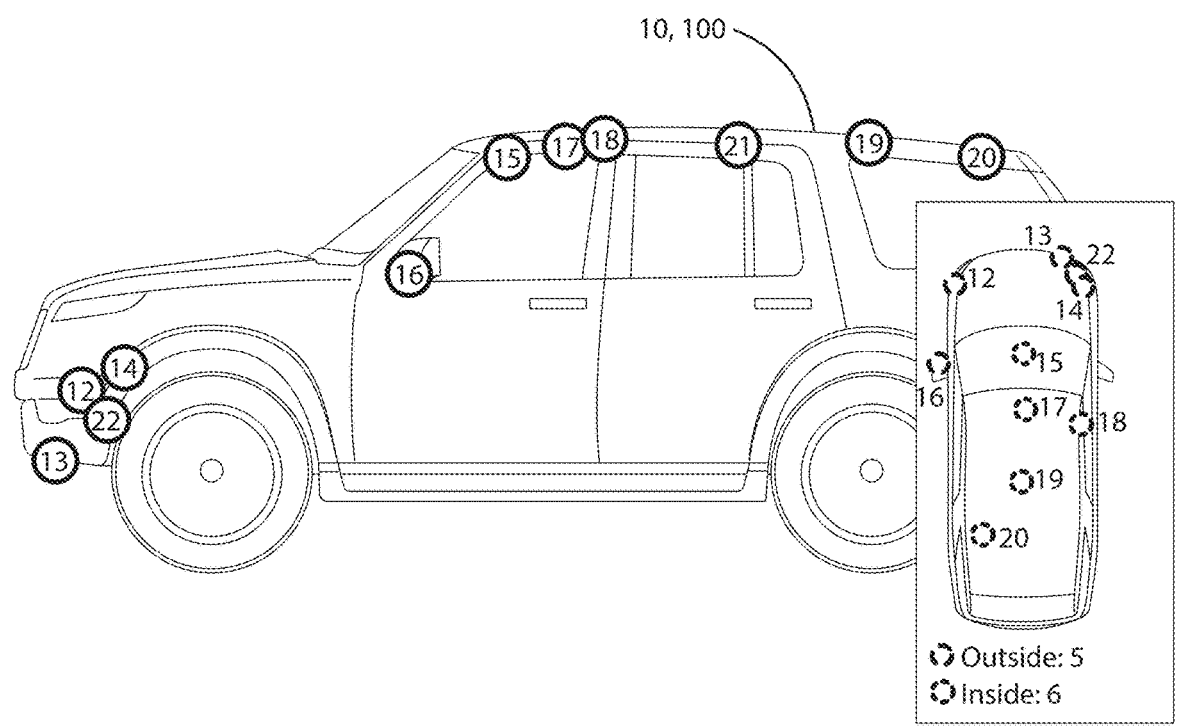

In one embodiment, evaluation of candidate locations via obtaining data for each sensor 40 at each candidate location may involve activating some but not all of the sensors 40. For example, as depicted in the illustrated embodiment of FIGS. 7 and 8, different sets of candidate locations may be tested, such that FIG. 7 depicts a first set of candidate locations to be evaluated and FIG. 8 shows a second set of candidate locations to be evaluated. The different sets may be mutually exclusive or intersecting with respect to candidate locations. In the illustrated embodiment of FIGS. 7 and 8, the different sets of candidate locations are determined based on the second set of candidate locations including a driver side, central locations, and passenger side locations of a vehicle with the first of candidate locations primarily focusing on a driver side of the vehicle.

B. Data Collection Path

The system 300 may be configured to obtain data for evaluating a plurality of candidate locations in conjunction with a target area or zone 330, as described herein. The target area or zone 330 may vary depending on the application, including a reference point or reference region of the object 10. For instance, the system 100 may be configured to determine a location of a remote device 20 relative to the reference point or reference region because a user is likely to approach or be proximate to the reference point or reference region. The zone 330 for evaluating the plurality of candidate locations may be determined based on the likely approach or position of the user relative to the reference point or reference region of the object 10.

Figure 9:
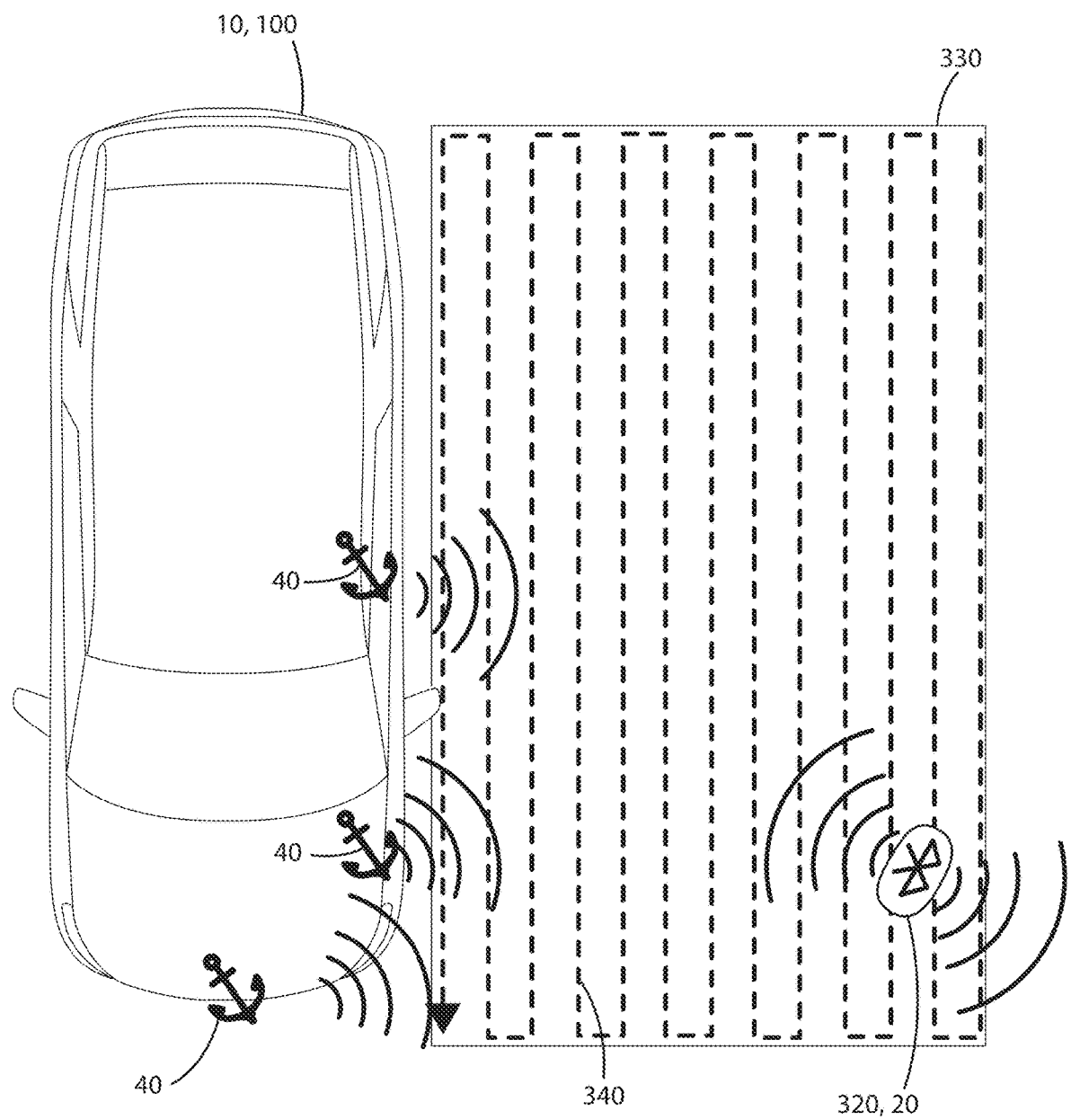
FIG. 9 depicts a data collection path in accordance with one embodiment of the performance evaluation system.

In the illustrated embodiment of FIG. 9, the target area or zone 330 is proximate to a driver's-side region of a vehicle, and is rectangular in shape and approximately 5 m×3 m in size. It is to be understood that the target area may vary from this shape and may vary in size.

The data collection path 340 depicted in the illustrated embodiment of FIG. 9 is a raster-type arrangement with the movable body 320 starting a corner location of the target area 330 and traversing back-and-forth toward a side opposite a side of the corner location. The step size between each test location in the dwell time at each test location may vary along the data collection path 340, or the step size and dwell time may be substantially constant along the data collection path 340.

Additional examples of target areas or zones 330 are shown in the illustrated embodiments of FIG. 10 and respectively labeled A-O. The target areas or zones 330 are based on regions of interest relative to the vehicle, including a likely location of a user carrying the remote device 20 and a likely approach vector for the user carrying the remote device 20. For instance, target areas 330 labeled respectively A-O relate to the vehicle as follows:

A) a 0.5 m area proximal to a front handle (e.g., a handle of a driver side door);
B) a 1 m area proximal to the front handle;
C) a 2 m area proximal to the front handle;
D) a 0.5 m area proximal to a rear handle (e.g., a handle of a driver side passenger door);
E) a 1 m area proximal to the rear handle;
F) a 2 m area proximal to the rear handle;
G) a 0.5 m area central to a driver side the vehicle;
H) a 1 area central to the driver side of the vehicle;
I) a 2 m area central to the driver side of the vehicle;
J) a 1 m area corresponding to the driver side of the vehicle;
K) a 2 m area corresponding to the driver side;
L) a rear approach area of the vehicle;
M) a front approach area of the vehicle;
N) a central approach area of the vehicle; and
O) a driver side approach area of the vehicle.

Data may be collected and candidate locations for a plurality of sensors 40 may be evaluated with respect to a data collection path aligned with the target area or zone 330. Such performance data may be obtained for multiple types of target areas or zones 330 as depicted for example in FIGS. 10A-O, and used to evaluate separately or collectively candidate locations for multiple zones 330.

Figure 11:
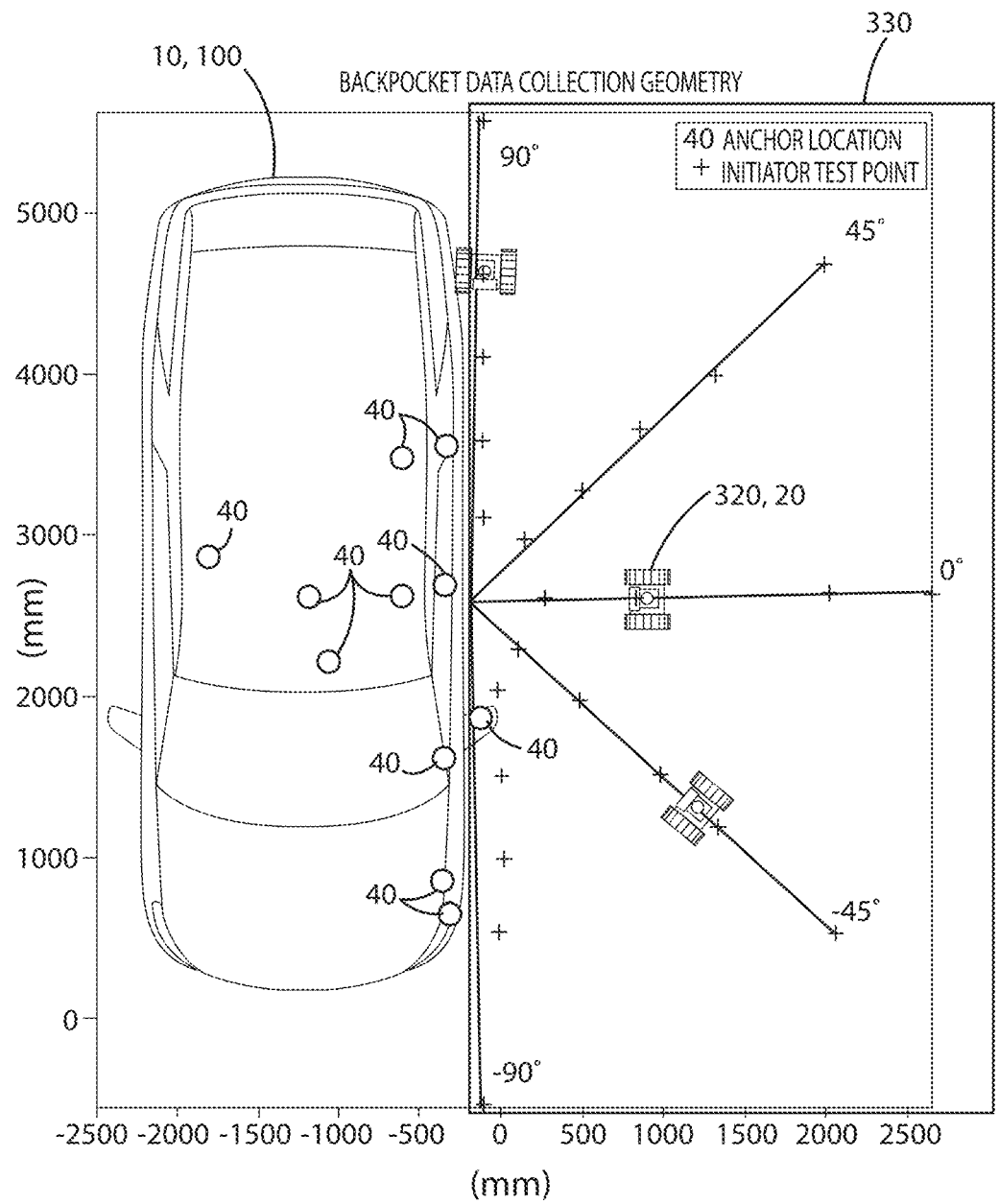
FIG. 11 shows a data collection path and zone for the performance evaluation system of one embodiment.

The movable body 320 may traverse through a zone 330 in alternative ways, such as a fanned out pattern depicted in the illustrated embodiment of FIG. 11, with the movable body 320 represented by person and configured to carry the remote device 20 along with an obstruction (e.g., a bag of water) operable to simulate a user carrying the remote device 20 in a back pocket. The movable body 320 may carry the remote device 20 to multiple positions, designated by a "+" in the illustrated embodiment, and as described herein the movable body 320 remain at each location for a period of time (e.g., a 62 s dwell time). In the illustrated embodiment the positions are arranged to fan out from a driver-side door handle, such that test point locations are approximately parallel to the door handle (+/−90°), normal to the door handle (0°) and diagonal to the door handle (+/−45°). The test point locations along these angles relative to the door handle may be approximately 0.5 m, 1.0 m, 1.5 m, 2.0 m, and 3.0 m.

The movable body 320 may traverse the target path or data collection path 340 as described herein. Truth data with respect to each data collection location of the zone 330 may be obtained for analysis and determining performance data as described herein. The truth data may include location data for the zone 330 determined by the control system 310, such that the controller 310 can correlate the location data with sensor data obtained from the plurality of sensors 40 of the candidate locations.

The location data obtained as part of the truth data for the control system 310 may be based on commands provided to the movable body 320 or information received from the movable body 320, or both. Location data for the movable body 320 can be determined via dead reckoning by inertial measurement (which may be output from an inertial measurement unit (IMU) of the movable body 320). However, there is a possibility that dead reckoning may yield inaccurate location data. Such inaccuracy may be caused by factors such as wheel slippage and IMU errors that cause drift in dead reckoning. In other words, the position array depicted in the illustrated embodiment of FIG. 11 may not be uniform or regular by using dead reckoning control for moving the movable body 320 from each position along the data collection path 340.

Figure 12:
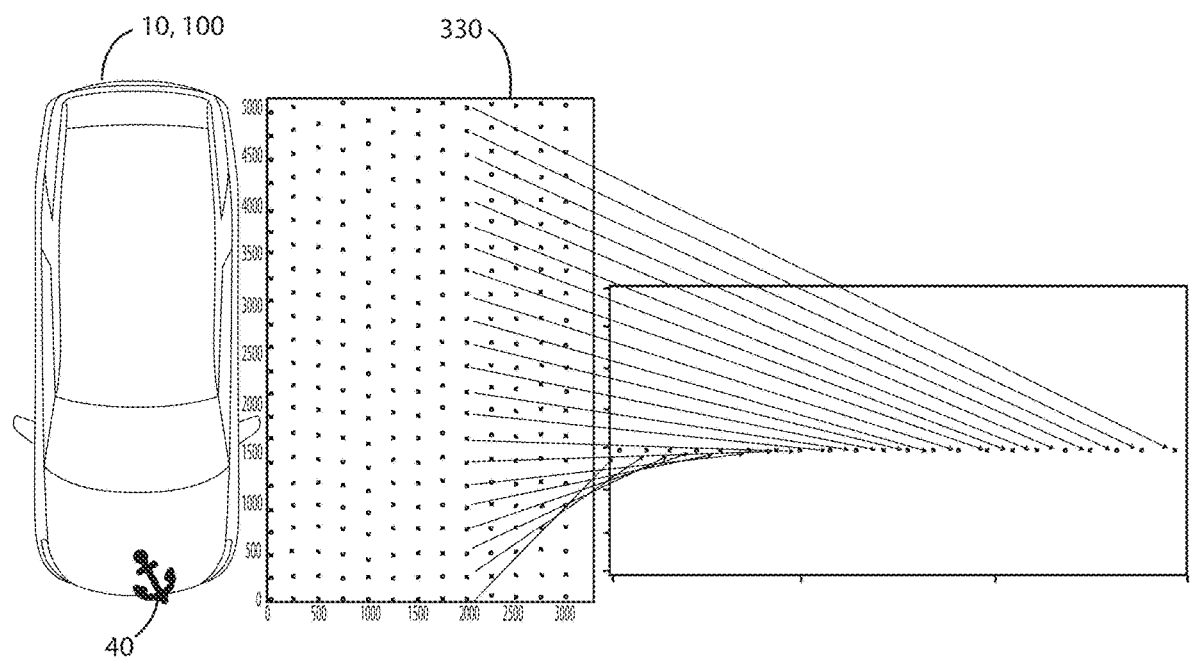
FIG. 12 depicts the performance evaluation system in accordance with one embodiment.

In one embodiment, inaccuracies in location data for the movable body 320 due to drift may be offset or corrected by correlating information obtained from the movable body 320 or commands provided to the movable body 320, or both, with stability of sensor characteristics obtained with respect to communications with one or more of the sensors 40. As depicted in the illustrated embodiment of FIG. 12, at each of the identified locations of the zone 330, the movable body 320 may dwell for a period of time. During this time, signal characteristics of communications may remain stable, such as UWB communications. This stability period may facilitate determining an offset for potential drift.

Additionally, or alternatively, drift may be offset or corrected by obtaining information from one or more other sensors disposed on the movable body 320, such as LIDAR and a depth camera. An extended Kalman filter (EKF) and/or simultaneous localization and mapping (SLAM) may be implemented in conjunction with such information to determine a location of the movable body 320 with respect to the vehicle.

Additionally, or alternative to using the stability period as a basis for determining an offset for potential drift, the stability period of communications may also facilitate synchronization of data between the movable body 320 and information obtained from the one or more sensors 40.

C. Data Collection

As described herein in conjunction with one embodiment, the system 300 may be configured to collect or obtain data from one or more sensors 40 with respect to communications with a remote device 20 carried by a movable body 320. The data may include one or more signal characteristics with respect to such communications, including for instance, signal strength (e.g., RSSI), time-of-arrival (TOA), time-of-flight (TOF), angle-of-arrival (AOA), and time-difference-of-arrival (TDOA). The one or more signal characteristics may be determined with respect to communications received by each of the one or more sensors 40. The communications may be direct between each of the one or more sensors 40 and the remote device 20. Additionally, or alternatively, the communications may be between the remote device 20 and a designated device, such as a master device (e.g., object device 50) or a sensor 40. The other of the sensors 40 may be configured to sniff or detect communications between the remote device and the designated device, and generate one or more signal characteristics with respect to such sniffed or detected communications. Sniffing may be achieved in a variety of ways including, for example, in accordance with one or more embodiments described in U.S. Pat. No. 9,794,753, issued Oct. 17, 2017, entitled SYSTEM AND METHOD FOR ESTABLISHING REAL-TIME LOCATION, to Stitt et al.—the disclosure of which is hereby incorporated by reference in its entirety.

The one or more sensors 40 may transfer the one or more signal characteristics determined with respect to communications to controller 310, via the object device 50 or direct to the controller 310.

The one or more signal characteristics may be analyzed to determine one or more metrics associated with the one or more metrics may be based on signal characteristics obtained from multiple sensors 40, or signal characteristics obtained from a single sensor 40. In one embodiment, the one or more metrics may include a computed range based on the one or more signal characteristics, missed detections, probability of non-line of sight. Additionally, or alternatively, the one or more metrics may include derived metrics, such as range errors.

The one or more metrics may be mapped onto a grid corresponding to the zone 330 to facilitate visualization. The mapping may be provided as the form of a heat plot and/or a contour plot. For instance, coarse mapping based on the one or more metrics may be used to generate a contour plot 332 depicted in the illustrated embodiment of FIG. 13 for a measured range associated with a sensor 40 located in the grill of the vehicle.

Figure 13:
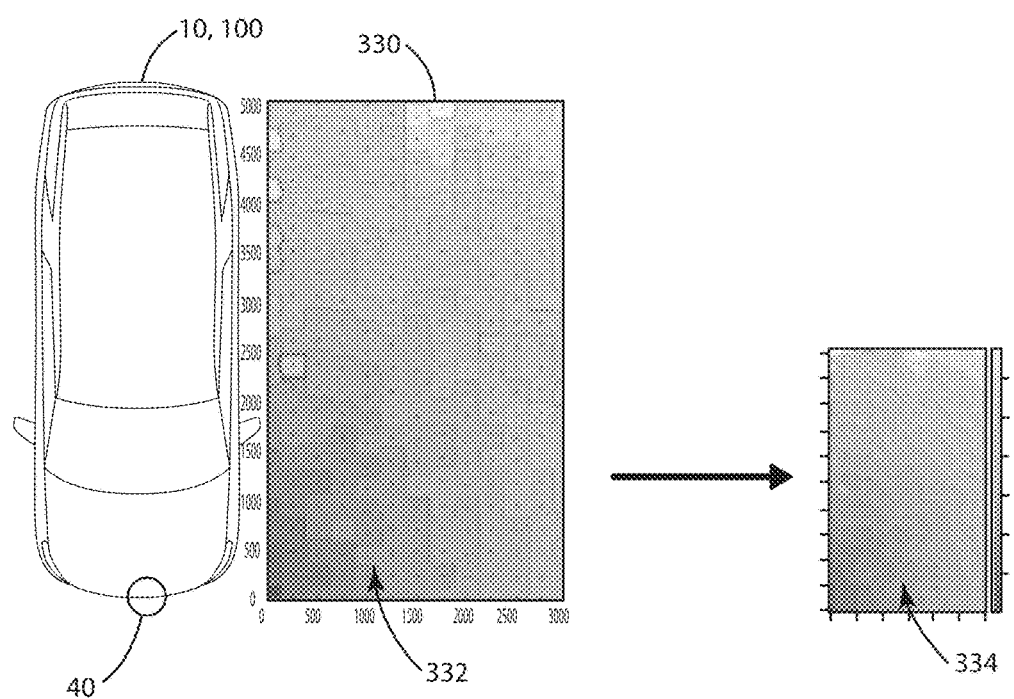
FIG. 13 depicts the performance evaluation system in accordance with one embodiment.

A heat plot with more fine contours relative to the contour plot 332, based on the same measured range associated with the sensor 40 located in the grill of the vehicle, is designated 334 in the illustrated embodiment of FIG. 13.

In other words, the metrics can be from a coarse mapped heat plot (e.g., contour plot 332) and can be interpolated to a finer, regularly space grid, such as the one depicted in the heat map 334. The mappings may be provided on a regularly space grid for visualization purposes. Although the heat maps 332, 334 are provided in conjunction with a measured range, it is to be understood that alternative or additional metrics may be depicted, including mean, range, RMS range error, standard deviation of range, missed detections, and likelihood of a line of sight measurement. Likelihood of a line of sight measurement may be based on data directly provided by each anchor such as provided by decawave records or measurements or may be derived from other types of measurements provided by each anchor depending upon the implementation. Example areas in which a percentage of measurements for the system recorded a 0% non-line of sight estimate correspond to the zones 330 depicted in the illustrated embodiment of FIGS. 10A-O.

D. Metrics

As described herein, the system 300 may determine one or more metrics based on one or more signal characteristics obtained from each of the sensors 40 disposed at a candidate location. The metrics may be analyzed to determine performance of a sensor at a candidate location, or performance of a group of sensors 40 at multiple candidate locations. The one or more metrics may include assessments of: system accuracy and precision; coverage and resolution; impact of environmental phenomenology (natural and man-made), including attenuation due to through-material propagation or complete obscuration; and effects of random errors in the system such as errors caused by thermal noise, signal interference, and reflection. The system 300 may assess candidate location performance based on metrics that account for: the magnitude and impact of various types of errors; the effect of errors on system performance (for both localization and zone classification); and effects of error mitigation strategies on system performance.

Figure 14:
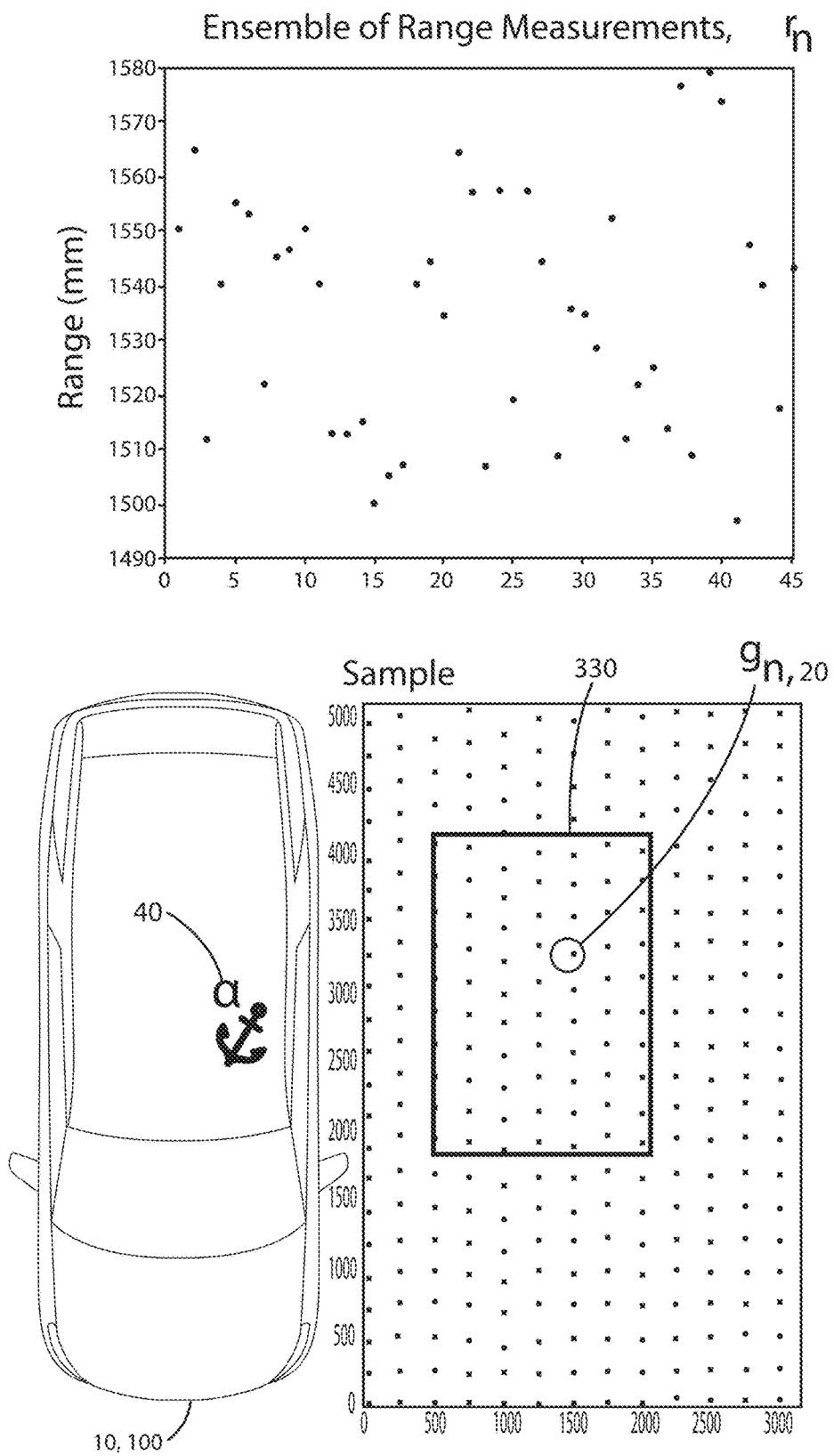
FIG. 14 shows measurements or samples obtained with respect to communication at a position in the performance evaluation system of one embodiment.
Figure 15:
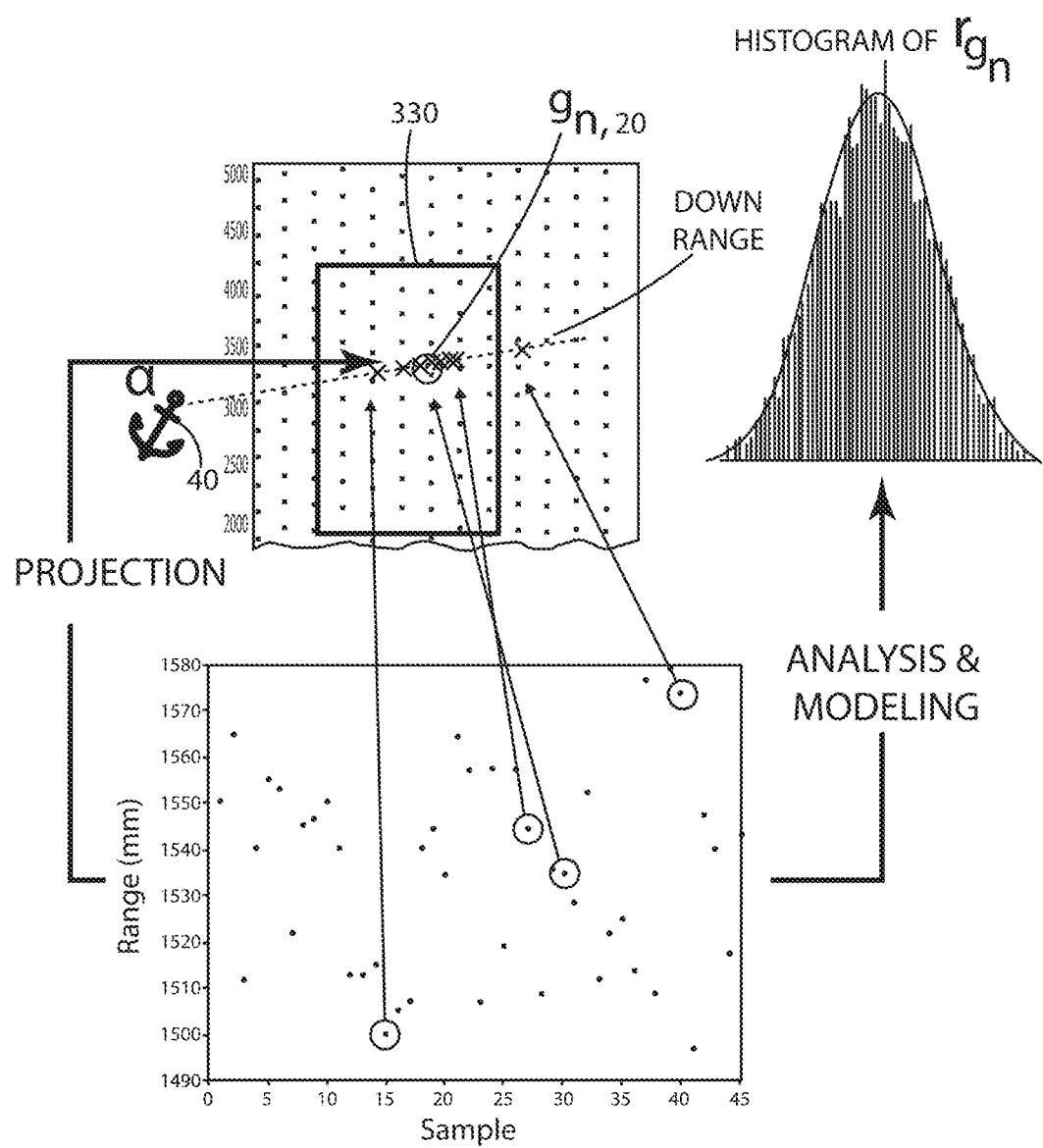
FIG. 15 shows data analysis of the measurements or samples shown in FIG. 14.
Figure 16:
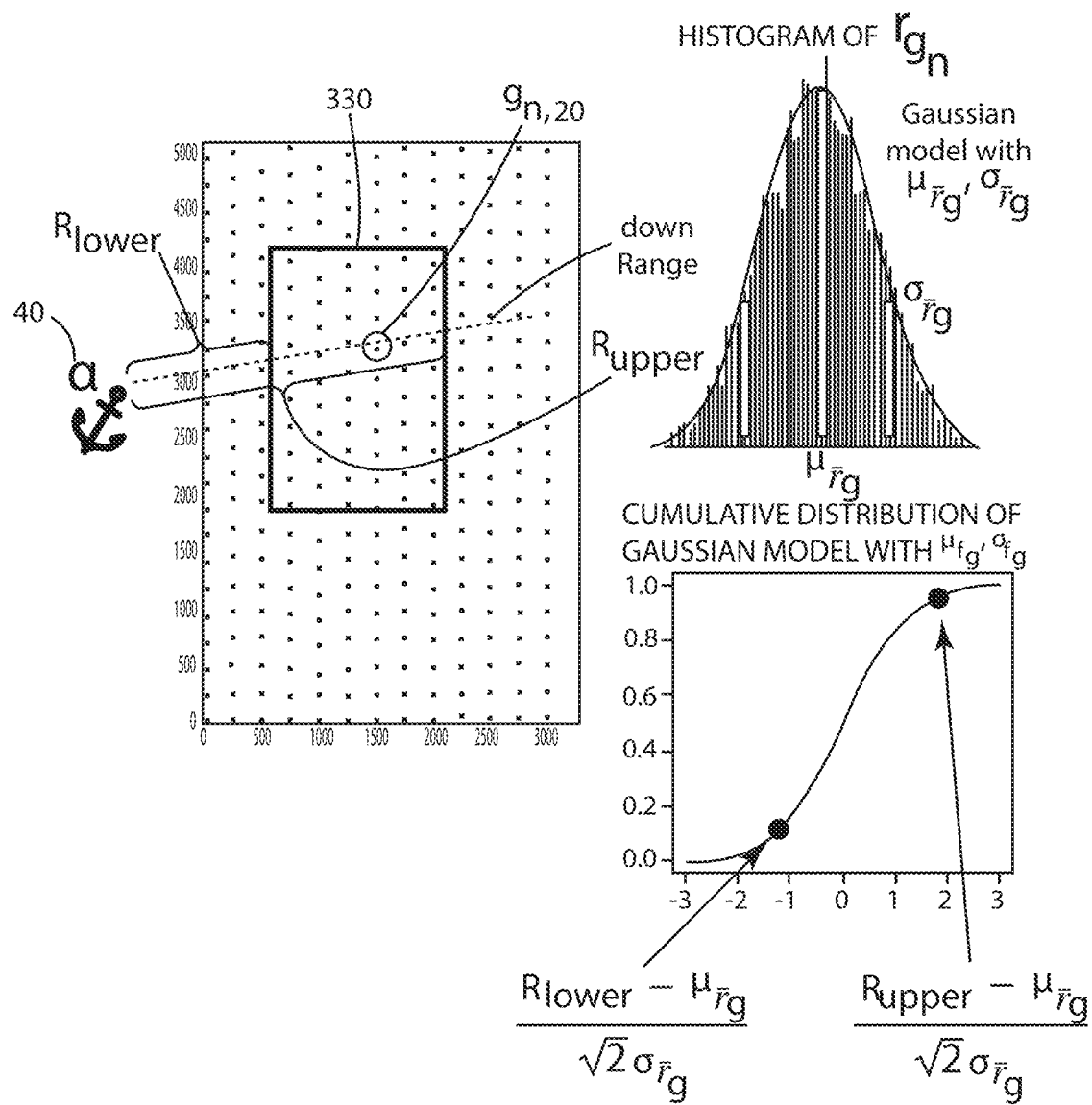
FIG. 16 shows further data analysis of the measurements or examples shown in FIG. 14.

In the illustrated embodiments of FIGS. 14-16, an ensemble of range measurements, $r_n$ is shown in connection with communications from a remote device 20 that are detected by a sensor 40. The remote device 20 may be disposed within a zone 330. The communications may be direct between the remote device 20 and the sensor 40, or alternatively, the communications may be transmitted from the remote device 20 to another device (e.g., an object device 50) and the sensor 40 may be operable to sense one or more characteristics of such communications. Forty-five samples are depicted in the illustrated embodiment in conjunction with a distance determination based on one or more signal characteristics obtained by the sensor 40. It is to be understood that more or fewer samples may be obtained, and that additional or different types of samples may be determined, depending on the configuration.

A detectability metric in accordance with one embodiment is determined in conjunction with the analysis shown in FIG. 15. The detectability metric may facilitate determining a performance indication for a candidate location of a sensor 40 for a zone classification system. In other words, the detectability metric may be indicative of whether the sensor output is helpful in determining whether the remote device 20 is disposed within a zone 330. The detectability metric, in one embodiment, is the probability that range measurements, $r_n$, for a remote device 20 at a location $g_n$ within the zone 330 will corroborate an assertion that the remote device 20 is in that zone 330. The probability may be determined based on the truth information obtained from the movable body 320, which may enable projection of ranges onto the coordinate system along with a downrange line running through the sensor 40 and the remote device location $g_n$. The ensemble of range measurements $r_n$ at $g_n$ may enable analysis to model the range, such as the histogram depicted in the illustrated embodiment and the probability distribution thereof. The detectability of a zone for given range measurements is considered a probabilistic metric based upon the relative positions of a sensor 40, the remote device 20, and the zone 330 under test. The detectability metric may aid in quantifying how errors in range measurements affect zone classification. The distribution of range measurements determined from experimental data for a given sensor/remote device pair provide statistics to model detectability in a zone 330.

Figure 17:
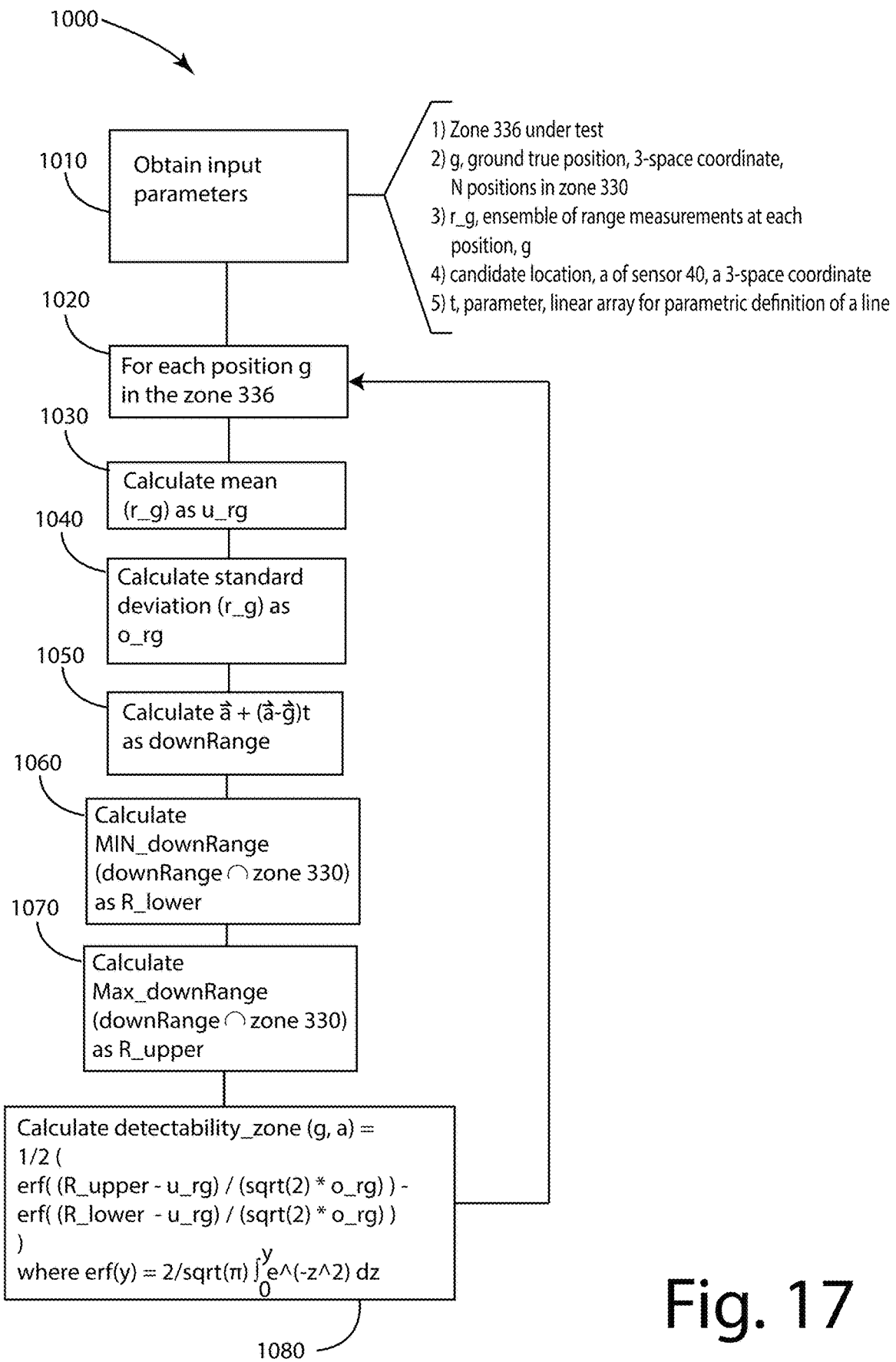
FIG. 17 shows a method of determining a detectability metric in accordance with one embodiment.
Figure 18:
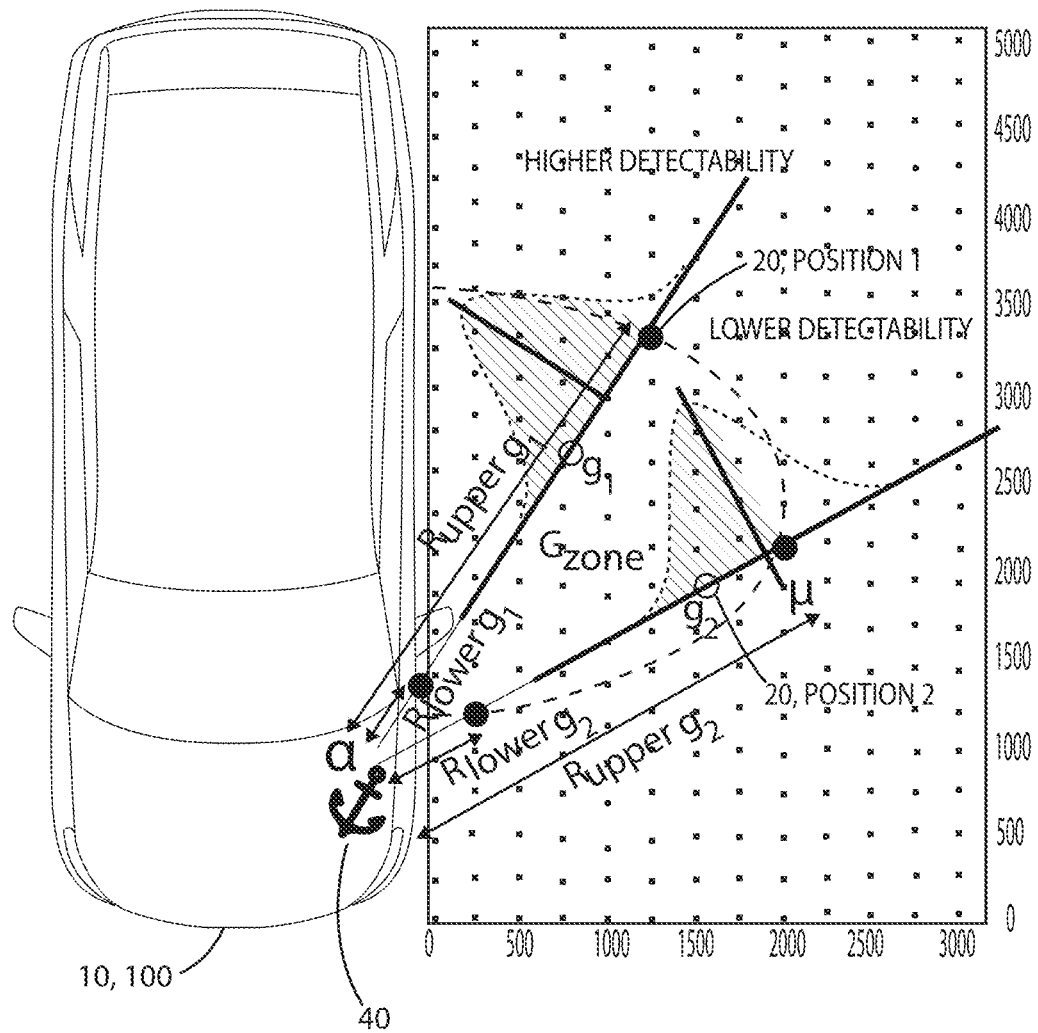
FIG. 18 shows a visual of the detectability metric in accordance with one embodiment.

A method of determining the detectability metric is shown in further detail in the illustrated embodiments of FIGS. 16 and 17. The method is designated 1000 and may include obtaining input parameters, including an area of the zone 330 under test, ground truth positions g according to a 3-space coordinate system, r_g as an ensemble of range measurements at each position g, a candidate location a for the sensor 40 within the 3-space coordinate system, and t as a parameter for a linear array for parametric definition of a line. Step 1010. For each position g, several parameters are calculated to facilitate generating a detectability metric. Step 1020. The mean and standard deviation for the ensemble of range measurements may be calculated. Steps 1040, 1050. A downrange value based on the location vectors of the sensor 40 and the remote device 20 may be determined, and maximum and minimum values for the same may be determined. Steps 1050, 1060, 1070. The detectability metric for the position g and sensor location a may be determined for each position g in accordance with the formula shown. The formula may vary from application to application and is not limited to the depicted form.

In the illustrated embodiment of FIGS. 18-21, it is noted that, some geometries of the sensor 40 and the remote device 20 in a zone 330 are more tolerant to range errors than other geometries. The detectability metric may quantify this tolerance. For instance, consider ranging with the sensor 40 and a remote device 20 placed at two ground truth points, g1 and g2, where the set of range measurements at each point have the same distribution of range delay and variability. The likelihood that a downrange measurement at g1 will be consistent with a range located within the zone 330 is much higher than that of a downrange measurement at g2.

The detectability throughout this zone 330 can be averaged to determine a value for detectability for each sensor 40, remote device 20, zone 330 combination, depicted separately in FIGS. 19 and 20. These scores can be rolled up into a single score for the entire driver-side area, as depicted in FIG. 21, which due to overlapping areas in the zone 330, weights locations in the area (driver-side door handle) higher than other less operationally significant locations.

Figure 22:
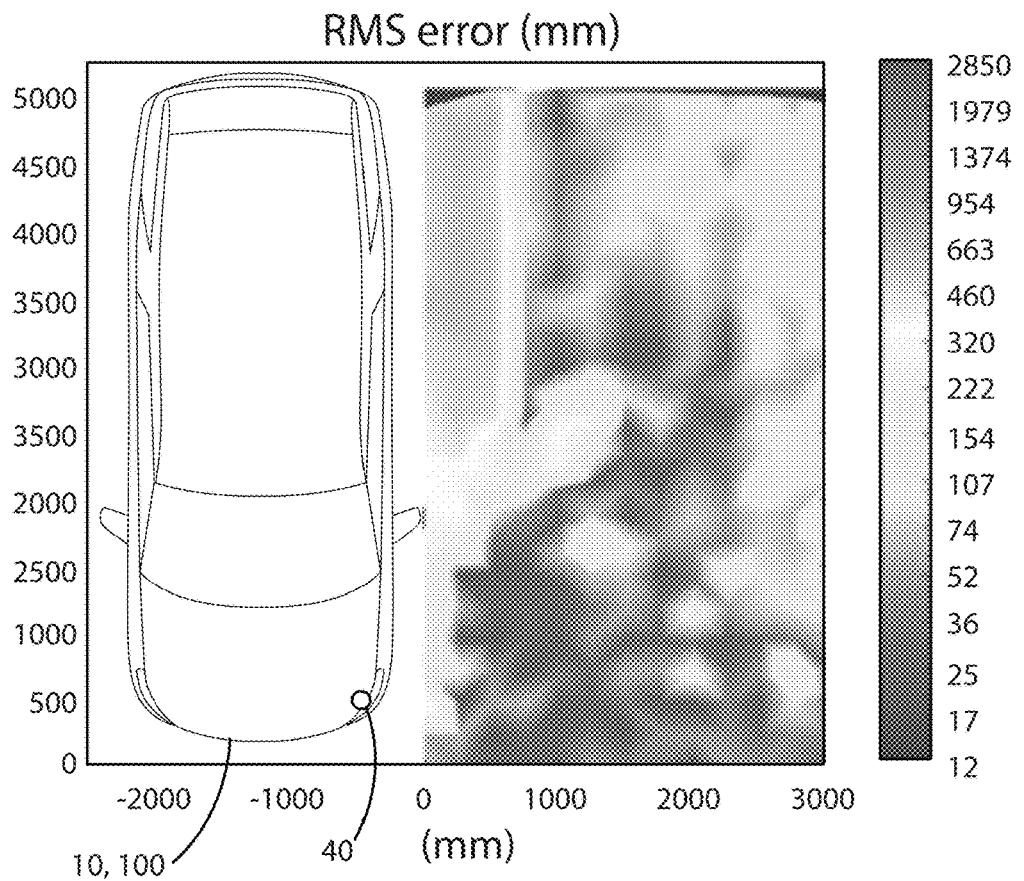
FIG. 22 shows an RMSE metric determined with respect to a zone under test in accordance with one embodiment.
Figure 23:
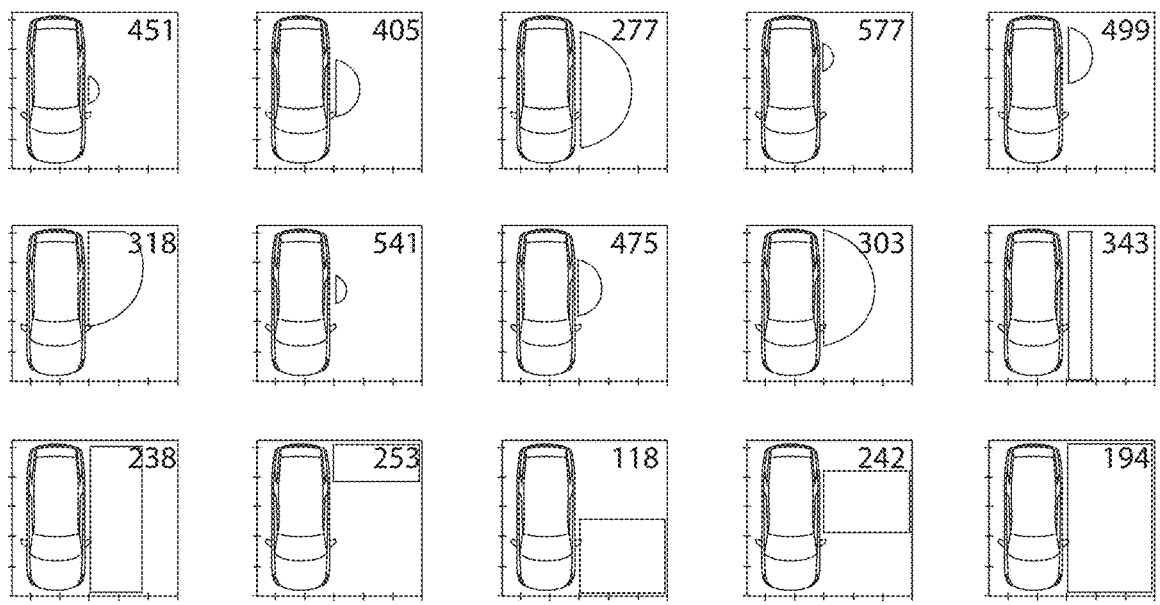
FIG. 23 shows the RMSE metric determined with respect to multiple zones under test in accordance with one embodiment.
Figure 24:
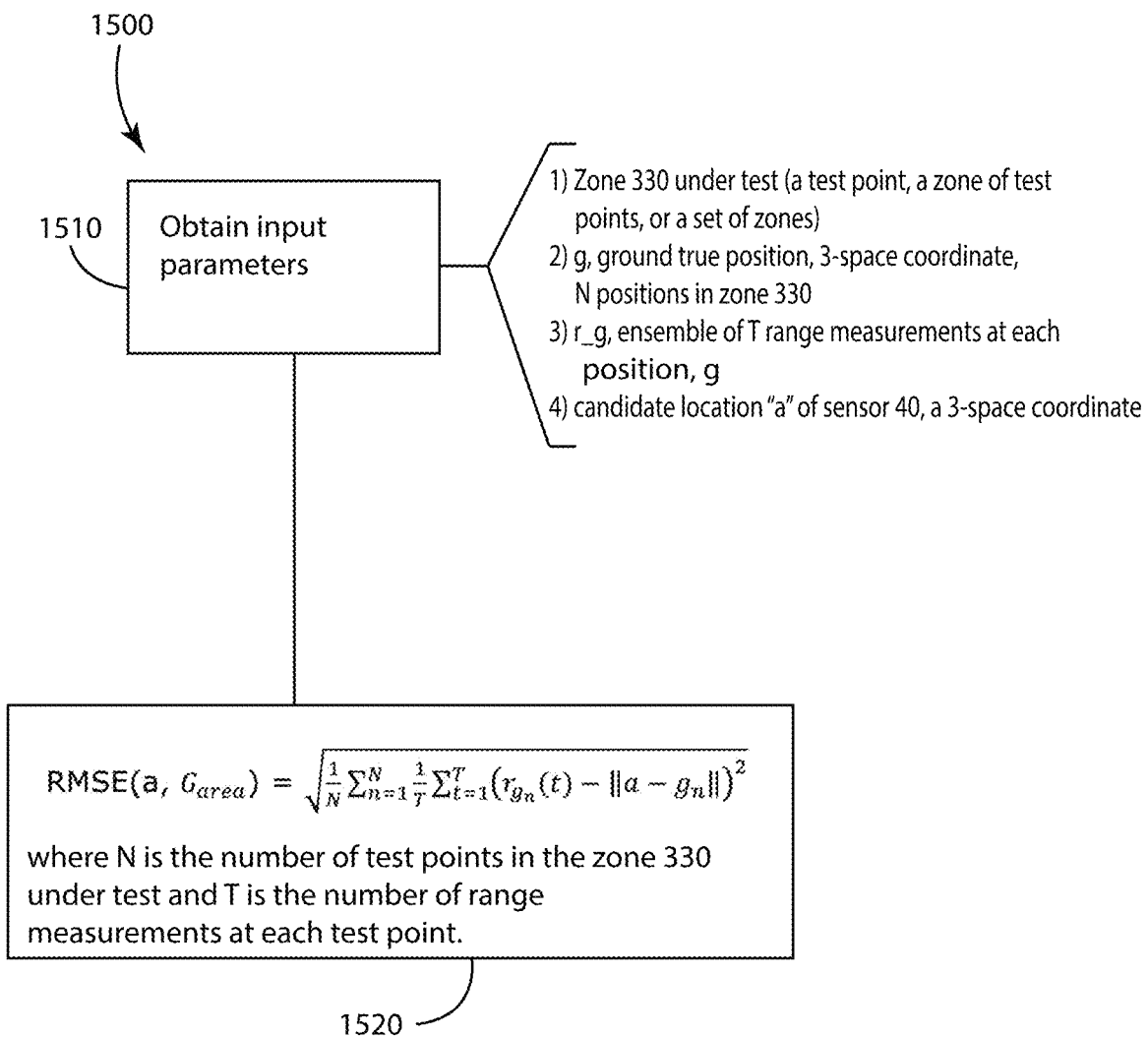
FIG. 24 shows a method of determining the RMSE metric in one embodiment.

In one embodiment, a method may be provided for determining a root-mean-square error (RMSE) metric as depicted in the illustrated embodiments of FIGS. 22, 23, and 24 and generally designated 1500. The RMSE may be used to quantify the difference between actual range and observe set of range data reported between a candidate position for a sensor 40 and the remote device 20. The RMSE may be defined as the square root of the mean of quadratic difference between the measured ranges in the actual range. RMSE may be a useful measure of system performance as well, as a metric often uses a cost function to be minimized when building a detection system for zone classification or localization.

The method 1500 may involve obtaining input parameters, including the zone 330 under test, ground truth information for N positions in the zone 330, r_g as an ensemble of T range measurements at each position g in the zone 330, and a candidate location of the sensor 40. The parameters may be fed to through a function to yield RMSE, which may be performed in accordance with the formula depicted in FIG. 24. Steps 1510, 1520. It is to be understood that the formula may vary from application to application.

The RMSE for each zone 330 can be computed, or a set of zones can be used to compute a single, overall RMSE. For instance, for the candidate location of the sensor 40 in the illustrated embodiment of FIG. 22, an overall RMSE of 349 has been calculated in one embodiment of the present disclosure. As an indicator of coverage, RMS can be computed per point, per zone, or even across many zones.

In one embodiment, a metric for determining performance may be determined based on RMSE. RMSE analysis yields that the Gaussian distribution of errors at each point in a zone 330 change from point-to-point within the zone 330, creating a multi-modal distribution over the entire zone 330. Statistics for Gaussian models (mean and standard deviation) may fail to accurately capture this variation and can lead to incorrect assumptions about the ranging performance.

Figure 25:
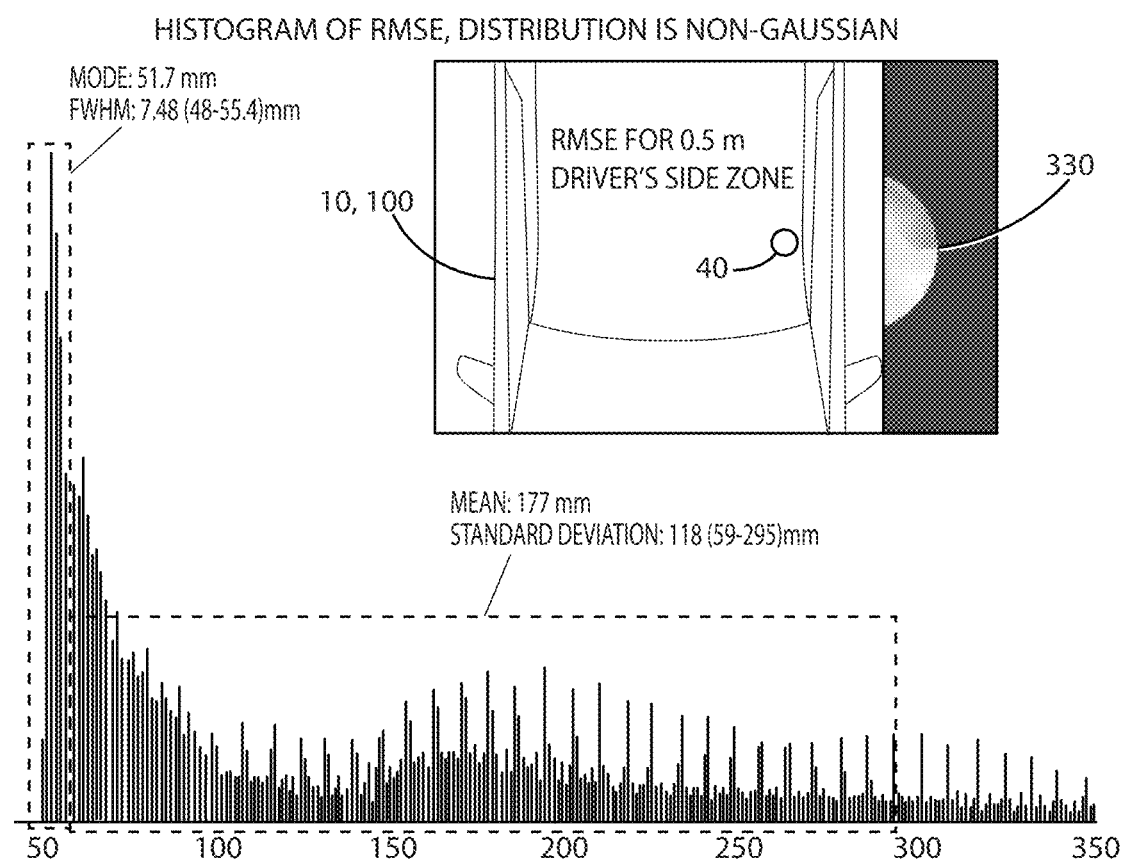
FIG. 25 shows a distribution of RMSE for a zone under test in accordance with one embodiment.

In one embodiment to capture the change and variability of ranging for a candidate location under test, the full width, half maximum (FWHM) of RMSE over the ground truth test points over a zone may be calculated. FWHM for RMSE may be the extent in range for which the RMSE occurs at least half as often as the most prevalent RMSE. Larger FWHM indicates that the ranging system has recorded range measurements that vary over a wider extent of ranges. A histogram of RMSE showing a non-Gaussian distribution is depicted in the illustrated embodiment of FIG. 25 in conjunction with the zone 330. The Mode is 51.7 mm, and the mean is 177 mm for the distribution with a standard deviation of 118 (59-295) mm. The FWHM determined for this distribution is 7.48 (48-55.4) mm.

Figure 26:
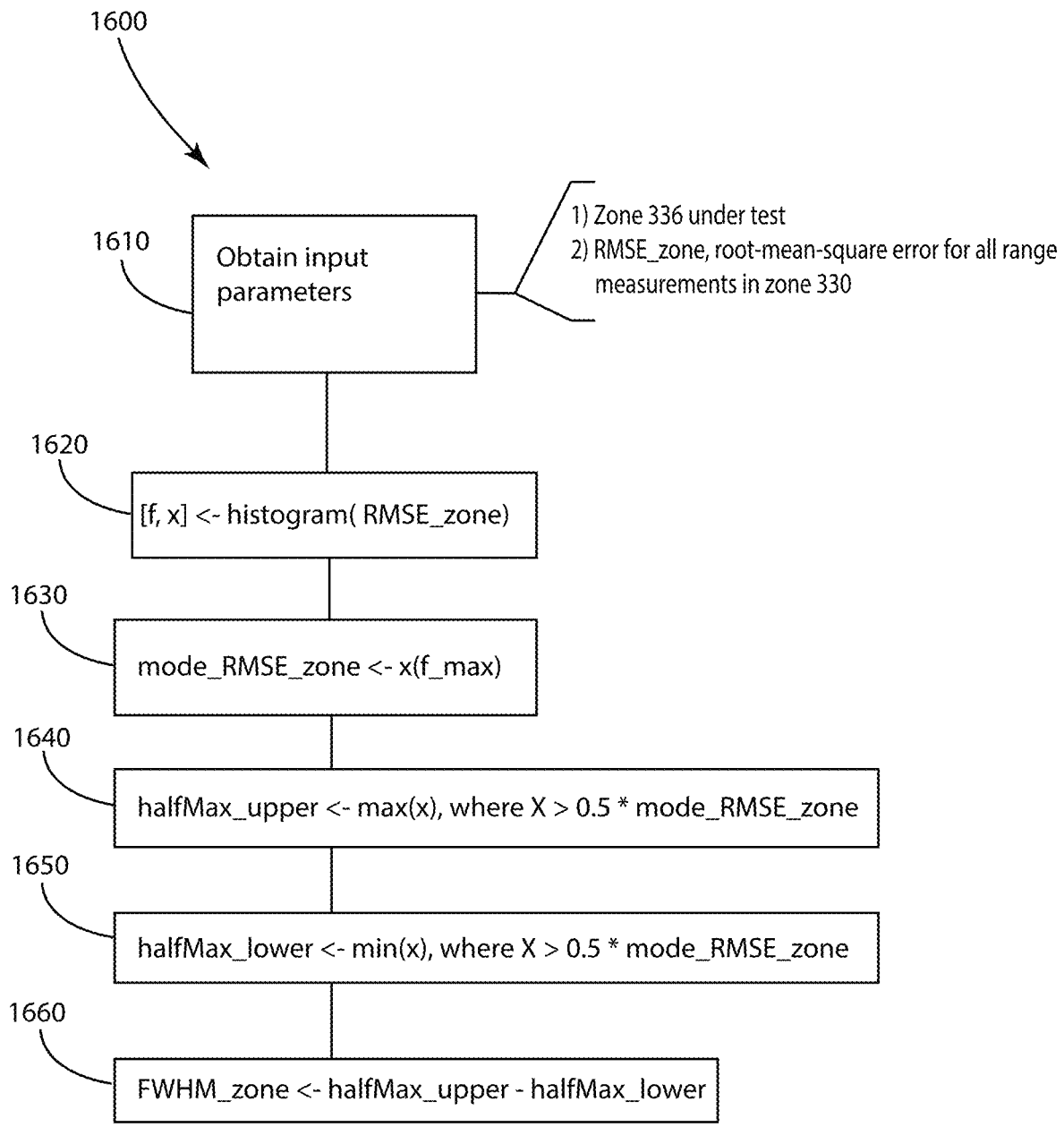
FIG. 26 shows a method of determining an FWHM metric in one embodiment.
Figure 27:
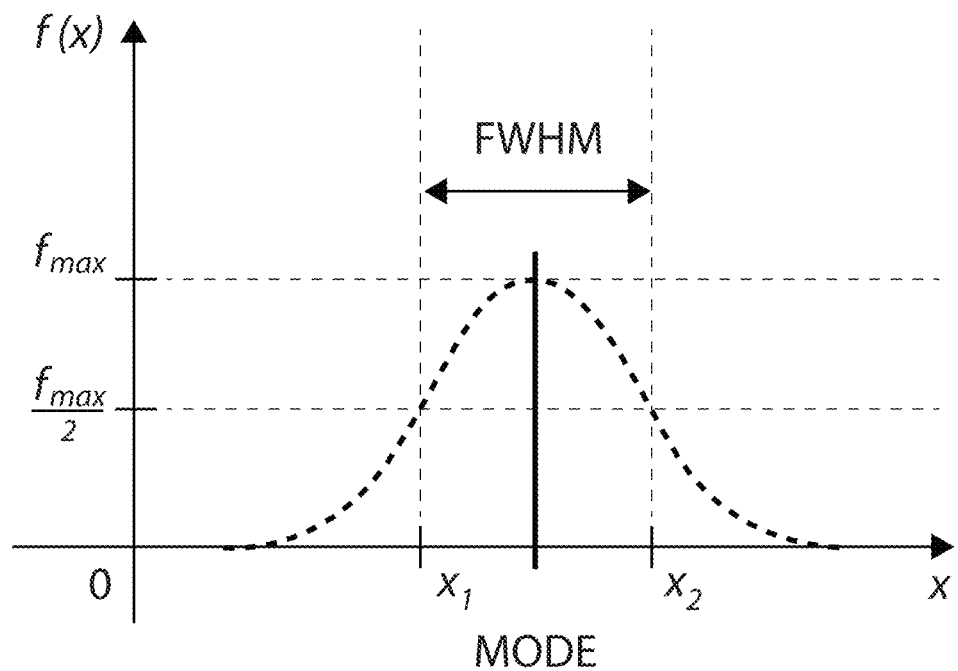
FIG. 27 shows a visual of the FWHM metric in one embodiment.

FWHM may be determined in accordance with one embodiment by the method 1600, which is depicted in FIG. 26. The method 1600 may include obtaining input parameters including RMSE for the zone 330 under test. Step 1610. The RMSE for the zone 330 may be translated to a histogram [f,x] (e.g., a distribution), and analyzed for mode as x(f_max). Steps 1620, 1630. A half max upper and half max lower parameter may be determined based on the mode and the minimum and maximum X values. Step 1640, 1650. The FWHM metric may be determined as the difference between the half max upper in half max lower parameters. Step 1660. The FWHM can be visualized in accordance with the histogram/distribution depicted in FIG. 27.

Figure 28:
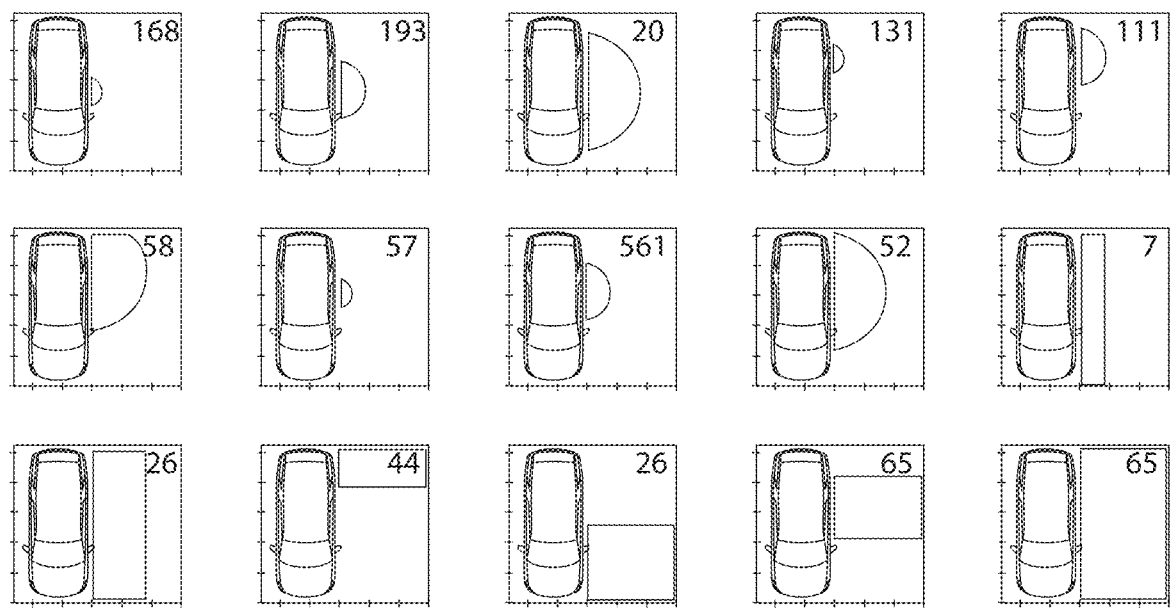
FIG. 28 shows the FWHM metric determined with respect to multiple zones under test in accordance with one embodiment.

The FWHM metric can be computed for each zone 330 being tested, as depicted in the illustrated embodiment of FIG. 28 for the identified zones. Additionally, or alternatively, the FWHM metric can be computed for a set of zones to compute a single, overall FWHM, which would be 146 for the data obtained in conjunction with the zones 330 under test in FIG. 28.

Figure 29:
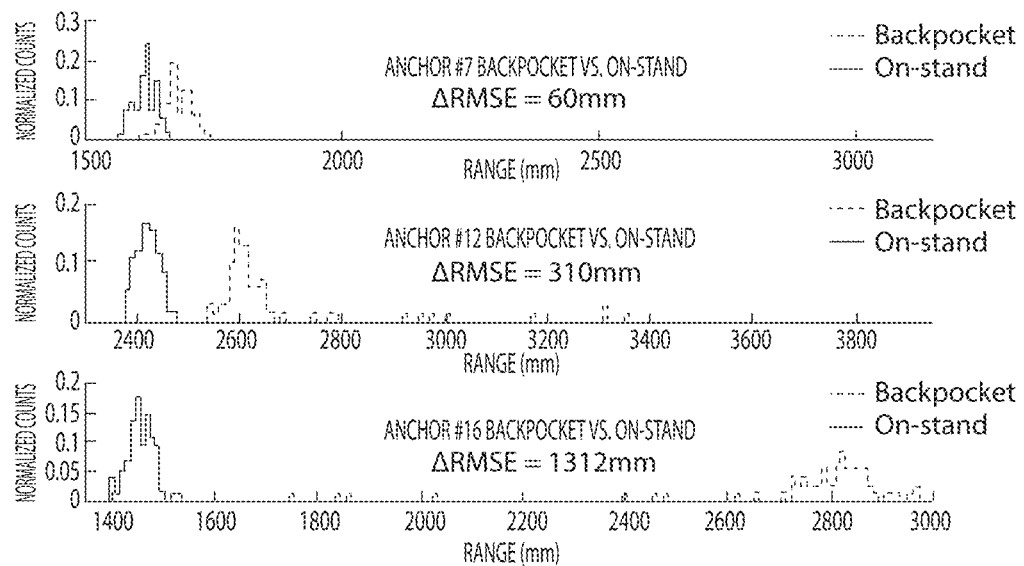
FIG. 29 shows a delta RMSE metric determined in conjunction with a zone under test in an obstruction based performance evaluation in one embodiment.
Figure 29:
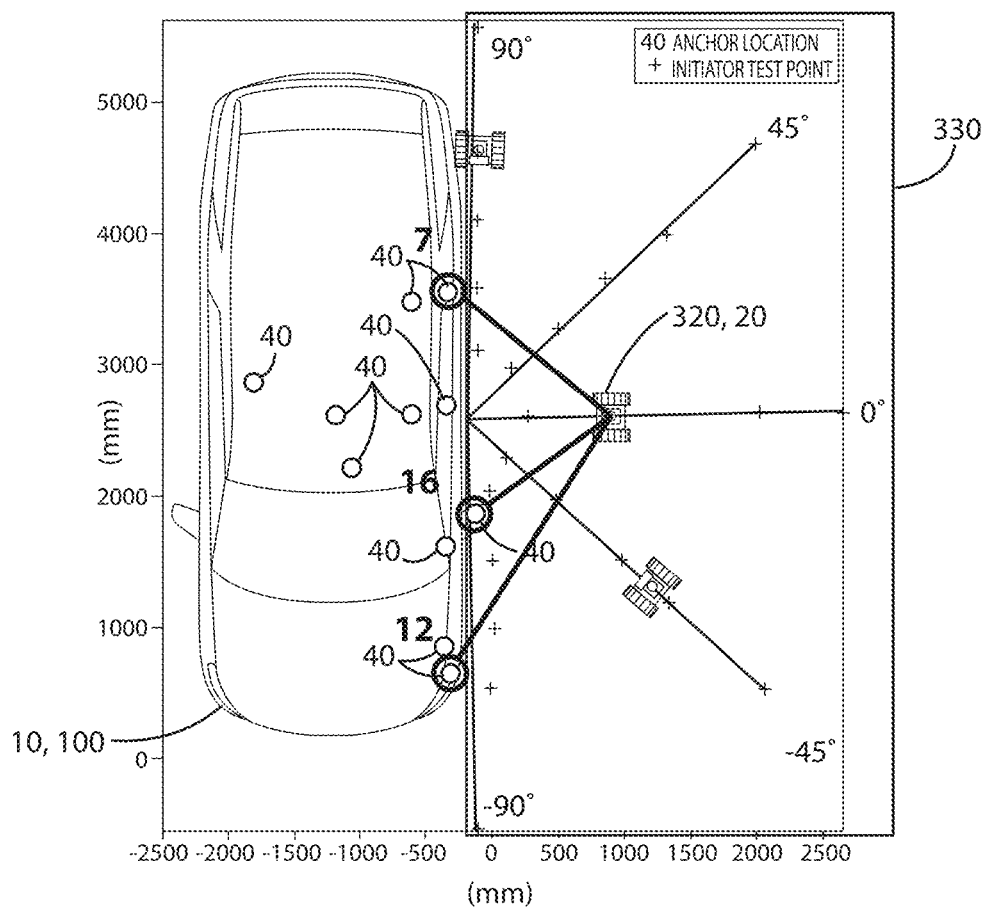

It is noted that, as discussed herein, an obstruction can be carried by the movable body 320 in conjunction with the remote device 20. As an example, the obstruction may be provided to emulate a "back pocket" scenario and its effect on performance. Alternatively, the movable body 320 may be a human person that carries the remote device 20 in their back pocket, and reports ground truth information to the control system 310. The effect of an obstruction can be determined via one or more metrics, including a delta RMSE metric. This metric is determined in conjunction with the candidate locations depicted in the illustrated embodiment of FIG. 29, where a person has carried the remote device 20 in their back pocket as an obstruction test. A comparison of the RMSE distributions for back pocket arrangements (e.g., an obstruction) and line of sight arrangements. The delta RMSE may be determined as the difference between these RMSE distributions, or the difference between RMSE_clear (root-mean-square-error for all range measurements in the clear where the remote device 20 is carried by the movable body 320) and RMSE_back_pocket (root-mean-square error for all range measurements where the initiator is in a person's back pocket or emulated as such).

In one embodiment, to characterize how much a human body attenuates the UWB signal, a comparison may be made between the range measurements of where the remote device 20 is in a person's back pocket and range measurements where the remote device is on a stand (e.g., the movable body 320). The change in RMSE or delta RMSE may capture both increased delay and increased variability in the range measurements.

Figure 30:
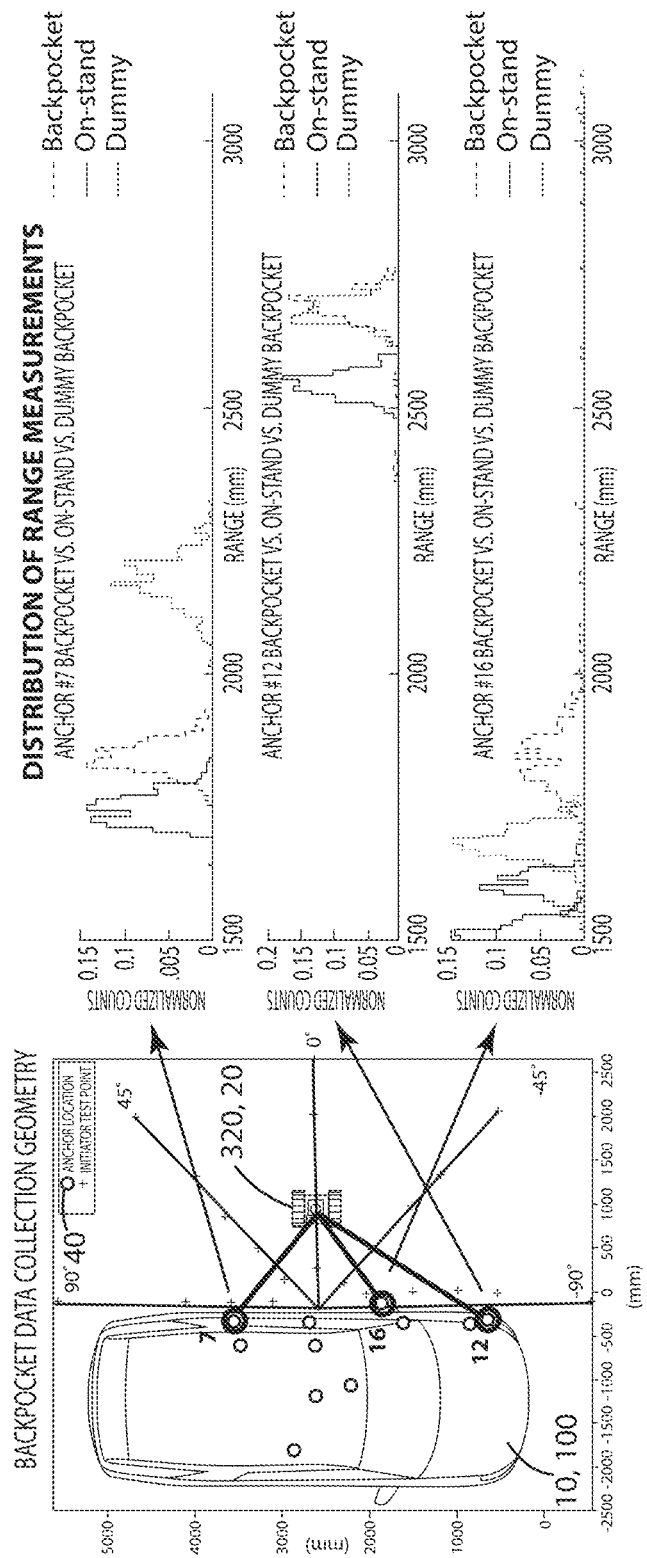
FIG. 30 shows a distribution of the delta RMSE metric for obstruction and non-obstruction test conditions in accordance with one embodiment.

An alternative obstruction procedure may involve use of a dummy that emulates a back pocket obstruction. A comparison of the results for no obstruction, a human carrying the remote device 20, and a dummy system that emulates the back pocket scenario are shown in FIG. 30. The dummy system may involve the movable body 320 carrying the remote device 20 in conjunction with an obstruction, such as a bag of 1.2 L 96% water solution 50 g poly vinyl alcohol and 4 g sodium borate ("slime"). This type of dummy obstruction, as compared to a human body, and a no obstruction test, along the test paths shown in FIG. 30, yields comparable results in range delay and variability. The delay and spread shown in the distributions of range measurements indicates that more energy is directed through the dummy obstruction than a human body for candidate positions 7 and 16. For candidate position 12, the delay and spread in range measurements indicate a reasonable match between the dummy obstruction and the human body and non-obstructed configurations. It is noted that differences may relate to the dummy construction, and that changing the construction of the dummy may yield further aligned results, such as by adding a pocket to the bag for holding shape and position of the remote device 20.

It is to be understood that the present disclosure is not limited to the specific metrics described herein. Additional or alternative metrics may be generated. Examples of alternative metrics include mean range (mm), median range (mm), standard deviation of range measurements (mm), missed detection (%), likelihood of non-line-of-sight measurement (%), mean range error (mm), standard deviations of range error (mm), and detectability per zone (%).

The likelihood of non-line-of-sight measurement may be computed as the number of measurements where the likelihood of non-line-of-sight metric equals 100% divided by the total number of measurements. In other words, this metric may be computed as the number of range measurements with a recorded non-line-of-sight (NLOS) value of 100 during an interval per number of total range measurements for a sensor 40 during an interval times 100.

Missed detections may be determined as the number of missing range measurements from a sensor 40 during an interval per number of total range measurements for the sensor 40 during an interval times 100.

Mean range error may be determined as the absolute value of the average difference between a measured range value and the ground truth range for an ensemble of range measurements.

Standard deviation of range error may be determined as the standard deviation of difference between a measured range value and the ground truth range for an ensemble of range measurements.

E. Evaluating Performance Metric

The system 300 in one embodiment may be configured to generate one or more performance metrics for candidate locations, or groups of candidate locations, for the one or more sensors 40 on the object 10 and with respect to one or more zones 330. The performance metrics may include, but are not limited to, one or more of the following: detectability; RMSE; FWHM; and delta RMSE.

Figure 10A:
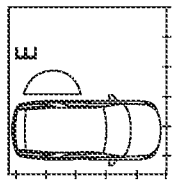
FIGS. 10A-O show various types of zones for evaluation in the performance evaluation system of one embodiment.
Figure 10B:
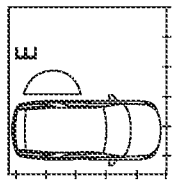
Figure 10C:
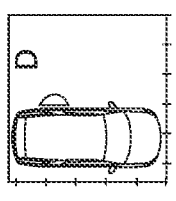
Figure 10D:
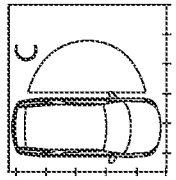
Figure 10E:
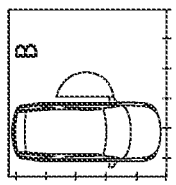
Figure 10F:
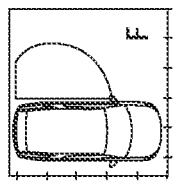
Figure 10G:
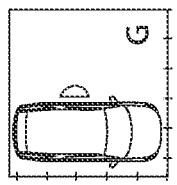
Figure 10H:
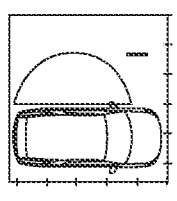
Figure 10I:
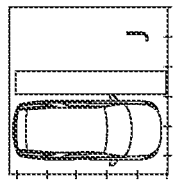
Figure 10J:
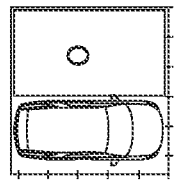
Figure 10K:
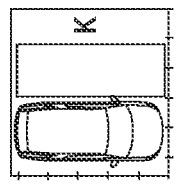
Figure 10L:
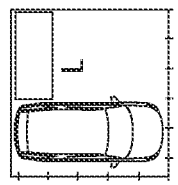
Figure 10M:
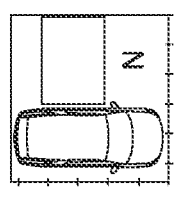
Figure 10N:
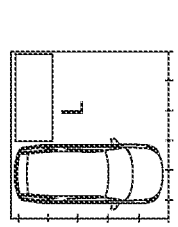
Figure 10O:
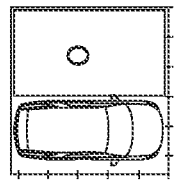

In the illustrated embodiment of FIG. 31, the detectability metric for a plurality of sensors 40 at candidate locations labeled 1-22 is shown in conjunction with each zone 330 identified and described in connection with FIGS. 10A-O. FIGS. 32 and 33 show the RMSE and FWHM metrics for the same candidate locations and zones 330. As can be seen, in one embodiment, the top performing candidate locations for each metric can be determined. For instance, the top 5 performing candidate locations identified by the detectability metric are candidate locations 3, 6, 16, 7, and 12. The top 5 performing candidate locations for the RMSE metric are candidate locations 3, 6, 7, 10, and 18, and the top 5 performing candidate locations for the FWHM metric are candidate locations 7, 10, 3, 18, and 6.

Figure 31:
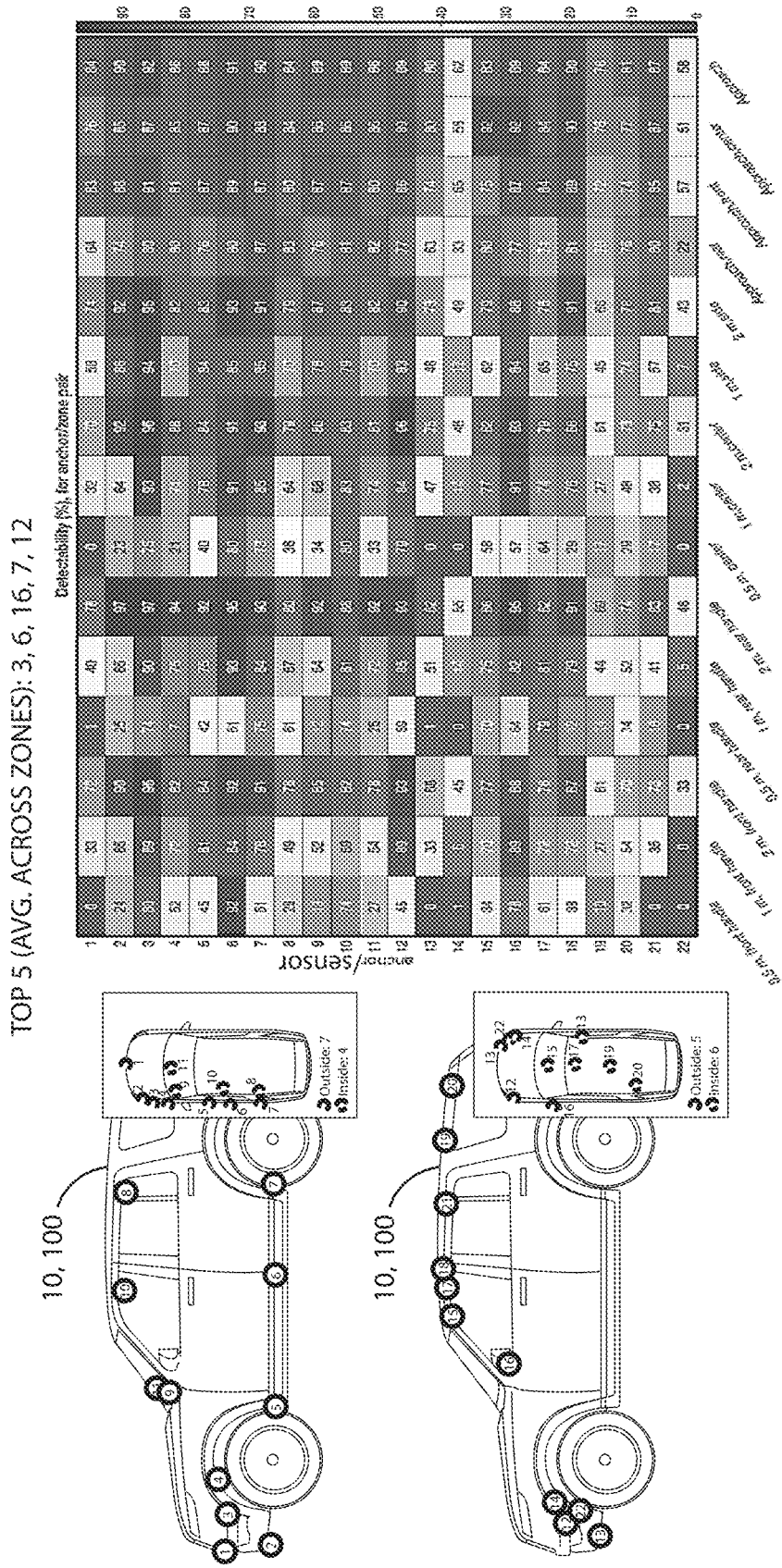
FIG. 31 shows a matrix of detectability for zones under test and candidate locations in accordance with one embodiment.
Figure 32:
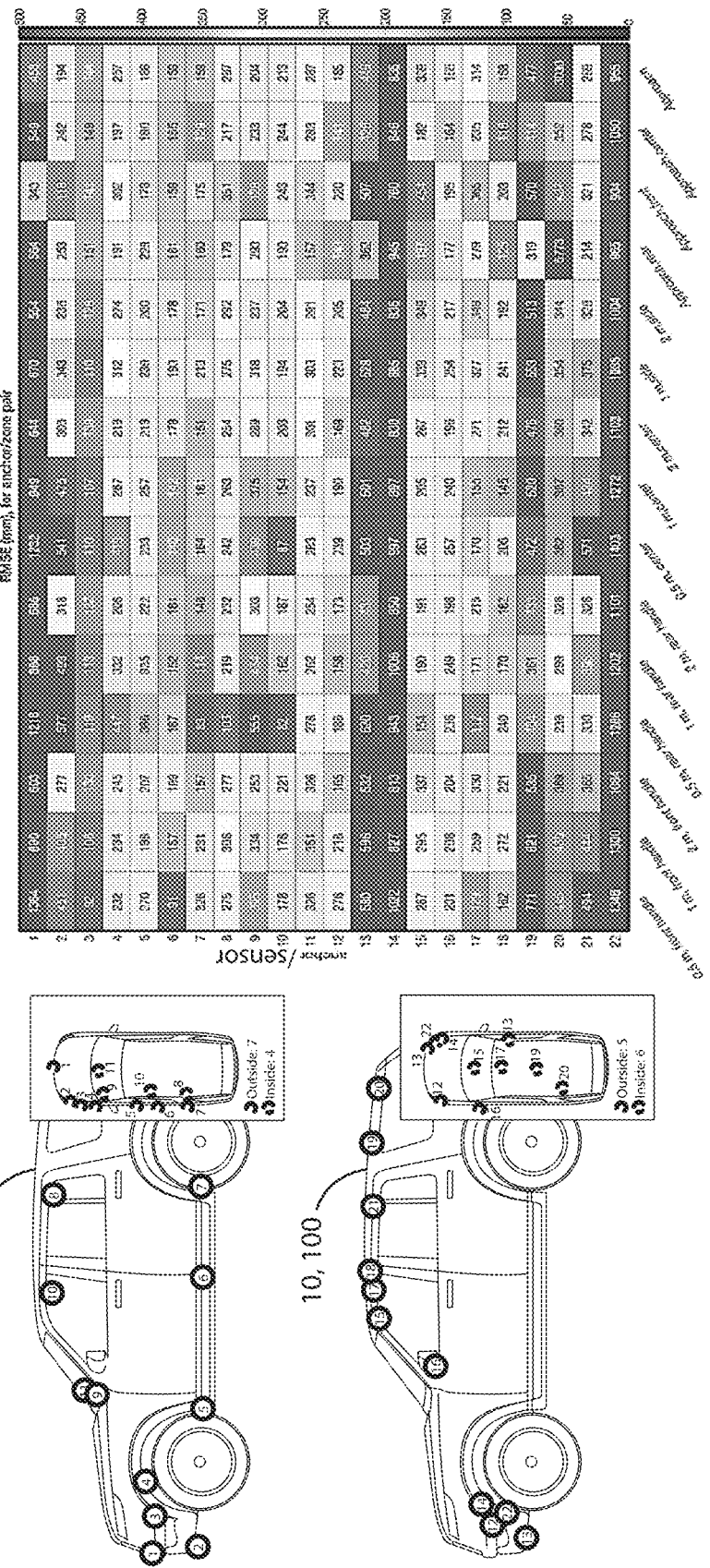
FIG. 32 shows a matrix of RMSE for zones under test and candidate locations in accordance with one embodiment.
Figure 33:
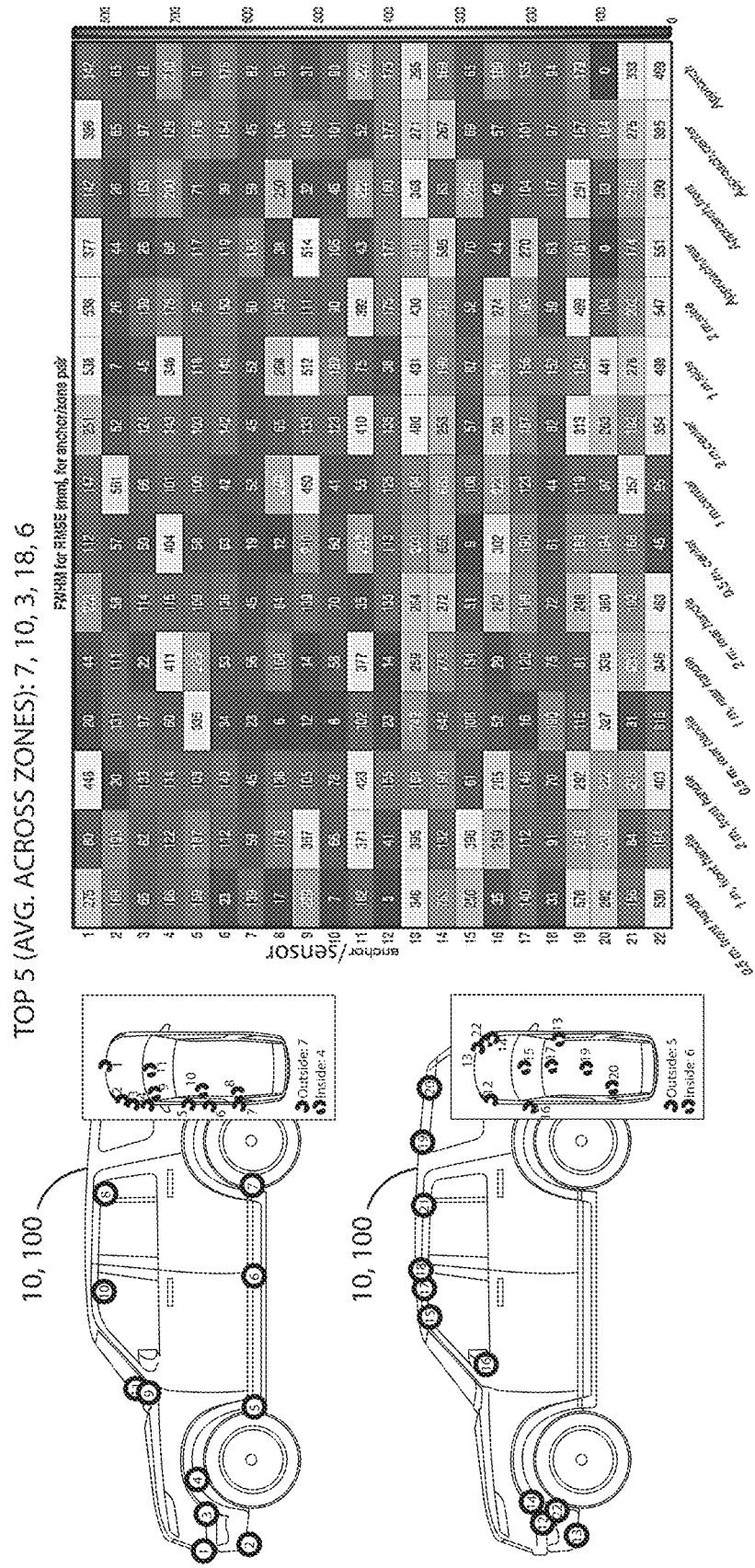
FIG. 33 shows a matrix of FWHM for zones under test and candidate locations in accordance with one embodiment.
Figure 34:
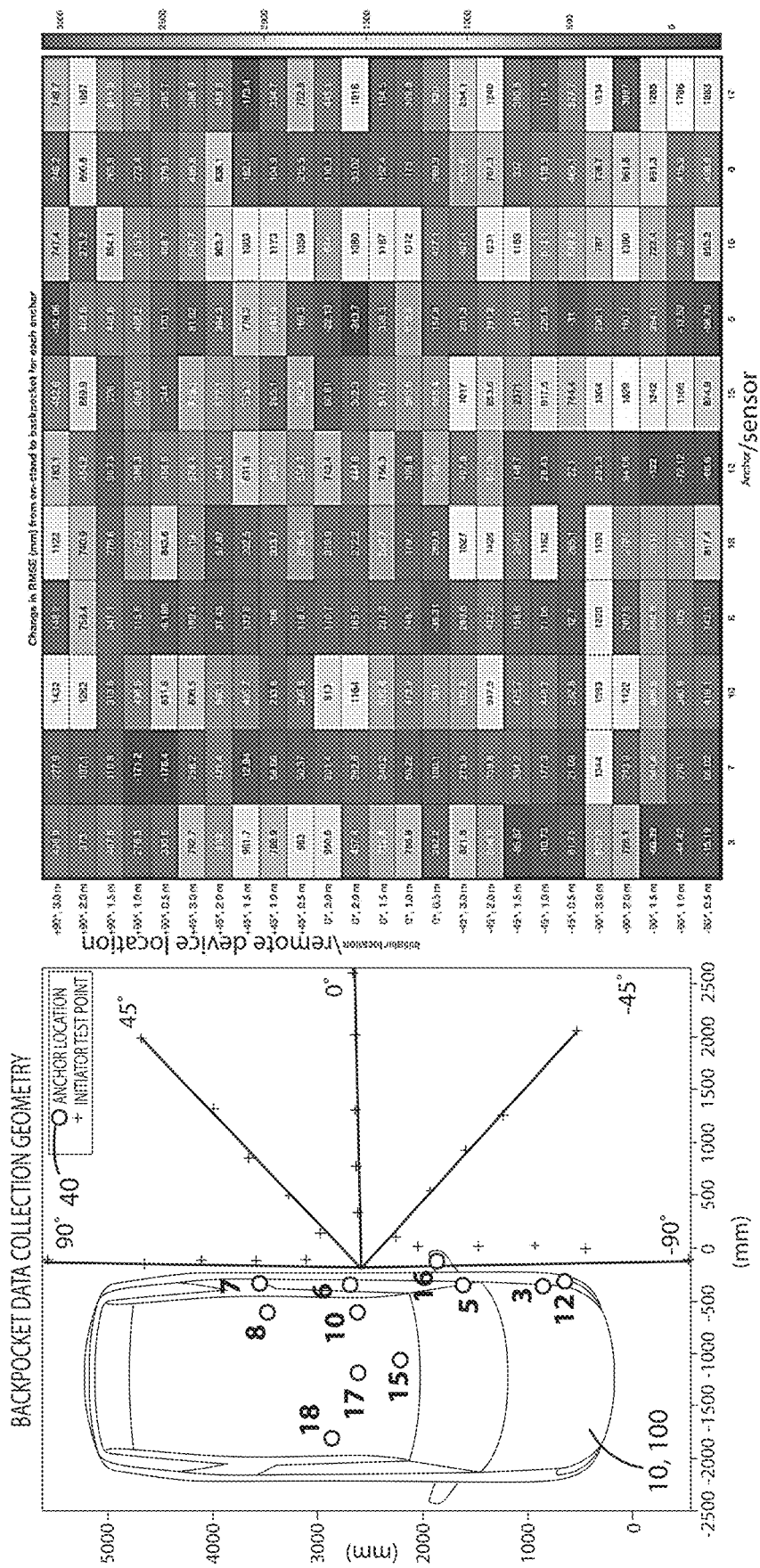
FIG. 34 shows a matrix of delta RMSE for zones under test and candidate locations in accordance with one embodiment.

A performance metric obtained with respect to a data collection with an obstruction can be analyzed in a manner similar to FIGS. 31-33 for each candidate location and for each zone 330 under test. For instance, in the illustrated embodiment of FIG. 34, delta RMSE is shown in conjunction with 1) the test paths at 90 deg., 45 deg., 0 deg., −45 deg., and −90 deg. relative to the driver side door hand and 2) candidate locations (labeled 3, 5-8, 10, 12, 15, 17, and 18) for a plurality of sensors 40.

Figure 35:
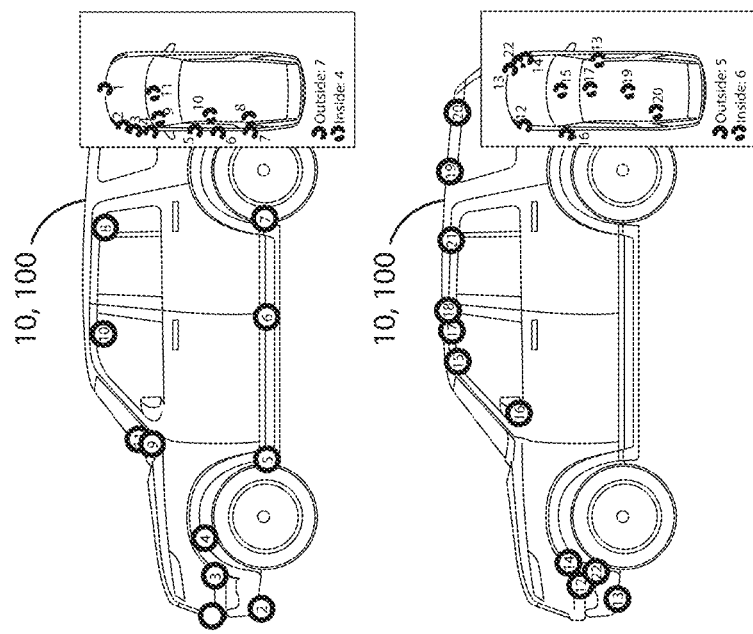
FIG. 35 shows composite rankings of candidate locations for multiple performance metrics in accordance with one embodiment.

As depicted in the illustrated embodiment of FIG. 35, the results for plurality of metrics for each candidate location of a sensor 40 relative to the zones 330 under test (e.g., data collection paths) can be processed to yield a composite score for each candidate location. The composite score may be based on an average of results across zones for detectability, RMSE, FWHM, and averaged across remote device test points for delta RMSE obstruction (e.g., RMSE back pocket). The top performing candidate locations, or group of candidate locations, may be identified for use in a real-time environment for determining location without the ground truth data.

Figure 36:
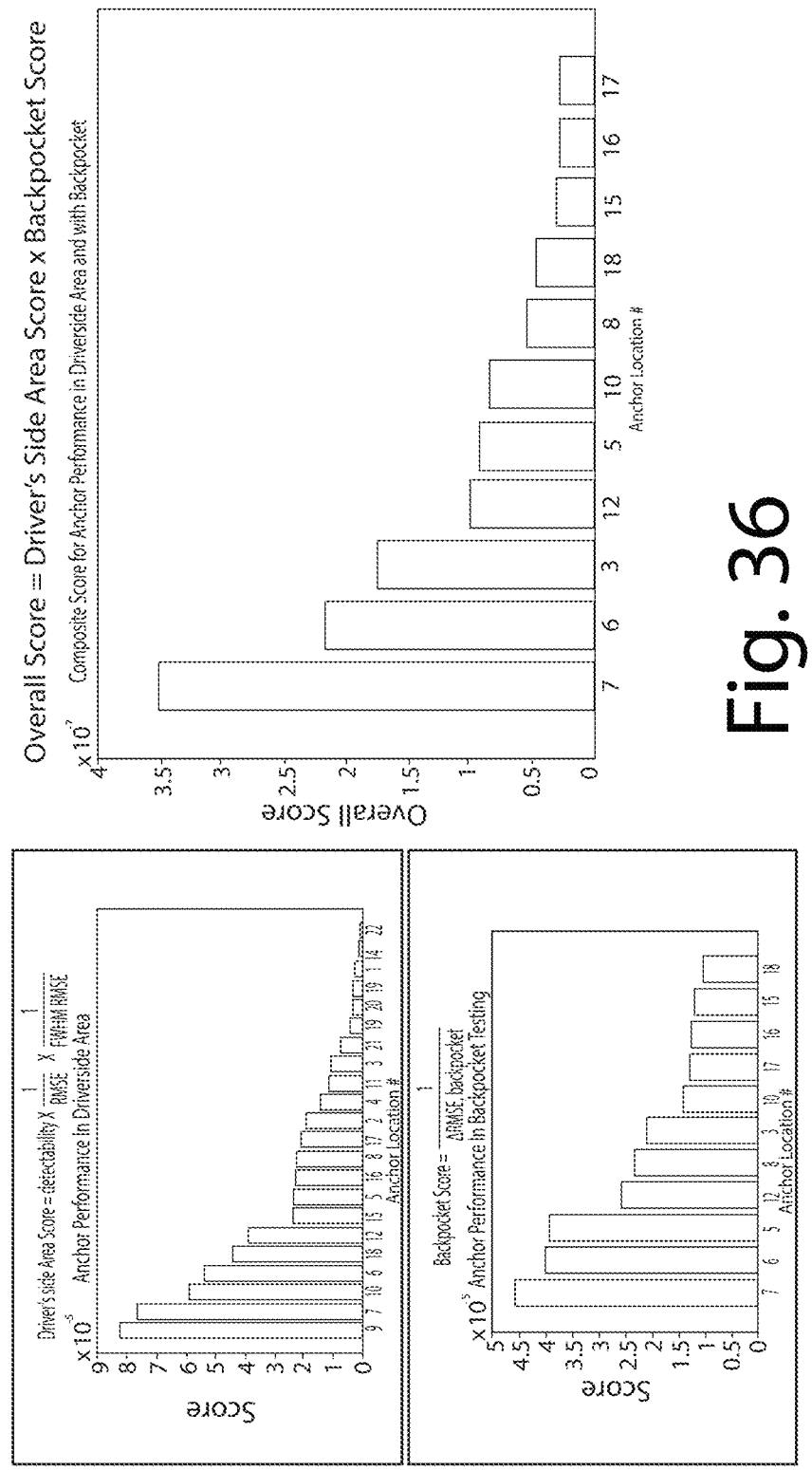
FIG. 36 shows a distribution of the composite rankings of FIG. 35.

The composite score for each candidate location may be determined in a variety of ways. In one embodiment, the composite score may be determined according to the following formula (also shown in FIG. 36):

$$\text{Driver's Side Area Score} = \text{detectability} \times \frac{1}{RMSE} \times \frac{1}{FWHM\ RMSE}$$

$$\text{Obstruction (backpocket) score} = \frac{1}{\Delta RMSE,\ \text{backpocket}}$$

$$\text{Overall Score} = \text{Driver's Side Area Score} \times \text{Obstruction Score}$$

Based a composite score from this formula for each candidate location, for the driver's side area, higher performing candidate locations can be identified. In the illustrated embodiment, the candidate locations with the better scores are 1) the lower, back corner of the driver's side door (7, 6); 2) high, front center of the wheel well (3) and middle and front center of the wheel well (12); 3) lower, front corner of the front driver's side door (5); and 4) headline above driver's seat near the door (10).

For the driver, the driver side zones performance metrics, detectability, RMSE, and FWHM RMSE are determined, and aggregated over 15 overlapping zones (e.g., FIGS. 10A-O) in the driver side area. Scores can be weighted to areas with most overlap across zones. As described in FIG. 36, delta RMSE may be determined for an obstruction condition, and the obstruction score can be used in conjunction with the driver side zones score to yield a composite score for each candidate location of the sensor 4.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of evaluating performance of a first and second sensors disposed on an object at respective first and second candidate location, the performance pertaining to effectiveness for determining a location of a portable device relative to the object, the method comprising:
communicating wirelessly between the portable device and the first sensor at a first position;
obtaining at least one first range measurement with respect to communications between the portable device and the first sensor at the first position;
communicating wirelessly between the portable device and the second sensor at the first position;
obtaining at least one second range measurement with respect to communications between the portable device and the second sensor at the first position;
communicating a directive to a movable body to move the portable device from the first position to a second position;
communicating wirelessly between the portable device and the first sensor at the second position;
obtaining at least one third range measurement with respect to communications between the portable device and the first sensor at the second position;
communicating wirelessly between the portable device and the second sensor at the second position;
obtaining at least one fourth range measurement with respect to communications between the portable device and the second sensor at the second position; and
ranking the performance of the first and second sensors at the respective first and second candidate locations.

2. The method of claim 1 comprising:
determining a first metric for the first sensor based on the first and third range measurements;
determining a second metric for the second sensor based on the second and fourth range measurements; and
ranking the performance of the first and second sensors based on the first and second metrics.

3. The method of claim 2 comprising:
determining a third metric for the first sensor based on the first and third range measurements;
determining a fourth metric for the second sensor based on the second and fourth range measurements;
generating a first composite score for the first sensor based on the first and third metrics;
generating a second composite score for the second sensor based on the second and fourth metrics; and
ranking the performance of the first and second sensors based on the first and second composite scores.

4. The method of claim 3 comprising determining a performance score for the first and second sensor with respect to first and second zones, and generating composite scores for the first and second sensors respectively based on the performance score for the first and second zones.

5. The method of claim 1 comprising transmitting a position directive to the movable body to travel from the first position to the second position.

6. The method of claim 1 wherein the wireless communications are UWB communications.

7. The method of claim 1 wherein the performance is ranked based on RMSE and detectability analysis of the first, second, third, and fourth range measurements.

8. A system for evaluating performance of first and second sensors disposed on an object at respective first and second candidate locations, the performance pertaining to effectiveness for determining a location of a portable device relative to the object, the system comprising:
a movable body operably coupled to the portable device, the movable body being configured to position the portable device in accordance with a position directive;
a control system configured to obtain first samples pertaining to communications between the portable device and the first sensor at a first position, the control system configured to obtain second samples pertaining to communications between the portable device and the second sensor at the first position;
the control system configured to obtain third samples pertaining to communications between the portable device and the first sensor at a second position, the control system configured to obtain fourth samples pertaining to communications between the portable device and the second sensor at the second position;
wherein the control system is configured to communicate the position directive to the movable body to change a position of the portable device from the first position to the second position; and
the control system configured to rank a performance of the first and second sensors at the respective first and second candidate locations.

9. The system of claim 8 wherein the control system is operable to determine a first metric for the first sensor based on the first and third samples and to determine a second metric for the second sensor based on the second and fourth samples; and
wherein the control system is operable to rank the performance of the first and second sensors based on the first and second metrics.

10. The system of claim 8 wherein the control system is operable to determine a performance score for the first and second sensors with respect to first and second zones, wherein the control system is configured to generate composite scores for the first and second sensors respectively based on the performance score for the first and second zones.

11. The system of claim 8 wherein the communications are UWB communications.

* * * * *